United States Patent
Hu et al.

(10) Patent No.: US 9,380,561 B2
(45) Date of Patent: Jun. 28, 2016

(54) METHOD AND SYSTEM OF CIRCUIT SWITCHED DOMAIN PAGE REALIZATION, METHOD OF SERVICE REALIZATION

(75) Inventors: Ying Hu, Shenzhen (CN); Zhiming Yu, Shenzhen (CN); Jinguo Zhu, Shenzhen (CN); Lei Yu, Shenzhen (CN); Liping Geng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 261 days.

(21) Appl. No.: 12/865,952

(22) PCT Filed: Jan. 24, 2009

(86) PCT No.: PCT/CN2009/070317
§ 371 (c)(1),
(2), (4) Date: Aug. 3, 2010

(87) PCT Pub. No.: WO2009/097814
PCT Pub. Date: Aug. 13, 2009

(65) Prior Publication Data
US 2011/0013623 A1 Jan. 20, 2011

(30) Foreign Application Priority Data
Feb. 3, 2008 (CN) .......................... 2008 1 0065368

(51) Int. Cl.
*H04L 12/66* (2006.01)
*H04W 68/12* (2009.01)
(Continued)

(52) U.S. Cl.
CPC ................ *H04W 68/12* (2013.01); *H04W 8/06* (2013.01); *H04W 60/005* (2013.01)

(58) Field of Classification Search
CPC ...................................................... H04W 68/12

USPC ................................................ 370/328; 455/7
See application file for complete search history.

(56) References Cited

U.S. PATENT DOCUMENTS

2005/0148348 A1* 7/2005 Cramby et al. ............... 455/458
2005/0221826 A1 10/2005 Lee
(Continued)

FOREIGN PATENT DOCUMENTS

CN 101291461 A 10/2008
WO 2007039757 A2 4/2007

OTHER PUBLICATIONS

3GPP TSG SA WG2 Meeting #60 Kobe,Japan Oct. 8-12, 2007; TD S2-074401.*
(Continued)

*Primary Examiner* — Parth Patel
(74) *Attorney, Agent, or Firm* — Brooks Kushman P.C.

(57) ABSTRACT

A method and a system for implementing CS domain paging are disclosed, applied in scenarios of performing CS domain paging for a called UE after ISR function is introduced in PS domain, and comprising: MSC/VLR only storing one Gs association; during CS domain paging, MSC/VLR sending a CS domain paging request message to the PS domain network element recorded in the Gs association in the MSC/VLR; after receiving the message, the PS domain network element initiating one or two CS domain paging procedures in the PS domain to transmit the CS domain paging to the called UE; or sending a paging response to the MSC/VLR directly without initiating CS domain paging. A method for transferring service information is also disclosed, applied in the scenarios that ISR function is activated in PS domain, and comprising: transmitting service message(s) between the ISR-associated PS domain network elements serving the UE to implement transfer of service information.

13 Claims, 10 Drawing Sheets

(51) Int. Cl.
*H04W 8/06* (2009.01)
*H04W 60/00* (2009.01)

(56) References Cited

U.S. PATENT DOCUMENTS

| | | | | |
|---|---|---|---|---|
| 2007/0207806 A1* | 9/2007 | Shaheen | ............... | H04W 68/00 455/436 |
| 2009/0170426 A1* | 7/2009 | Jung et al. | ........................ | 455/7 |
| 2010/0189035 A1* | 7/2010 | Pehrsson et al. | ............. | 370/328 |
| 2010/0260105 A1* | 10/2010 | Keller et al. | ................. | 370/328 |
| 2010/0265884 A1* | 10/2010 | Vikberg et al. | ............... | 370/328 |
| 2010/0303007 A1* | 12/2010 | Witzel et al. | ................. | 370/328 |
| 2010/0303041 A1* | 12/2010 | Diachina et al. | ............. | 370/331 |

OTHER PUBLICATIONS

3GPP TSG SA WG2 Meeting #62 Maina Del Rey, CA , USA Jan. 14-18, 2008; TD S2-080835.*

Niklas Blum, Fabricio Carvalho de Gouveia, Thomas Magedanz, "An Open IMS Testbed for exploring Wireless Service Evolution and Network Architecture Evolution towards SAE and LTE", 2007, IEEE.*

3GPP Long-Term Evolution/system architecture evolution overview, Sep. 2006, Alcatel.*

3GPP TS 23.401 V8.0.0 (Dec. 2007);3rd Generation Partnership Project; Technical Specification Group Services and System Aspects; General Packet Radio Service (GPRS) enhancements for Evolved Universal Terrestrial Radio Access Network (E-UTRAN)access (Release 8).*

International Search Report for PCT/CN2009/070317, Completed by the Chinese Patent Office Apr. 23, 2009, 6 Pages.

3GPP TSG SA WG2 Meeting #62 TD S2-080835, CS Fallback with ISR, Jan. 14-18, 2008, 2 Pages.

3GPP TSG SA WG2 Meeting #63 TD S2-081174, "CS Fallback with ISR", Feb. 18-22, 2008, 4 Pages.

3GPP TS 23.401 V8.0.0, "3rd Generation Partnership Project; Technical Specification Group Services and System Aspects; General Packet Radio Service (GPRS) Enhancements for Evolved Universal Terrestrial Radio Access Network (E-UTRAN) Access (Release8)" Dec. 31, 2008, 167 Pages.

Global System for Mobile Communications, 3GPP TS 29.018, 3rd Generation Partnership Project; Technical Specification Group Core Network and Terminals; General Packet Radio Service (GPRS); Serving GPRS Support Node (SGSN)—Visitors Location Register (VLR) Gs Interface layer 3 specification (Release 7), Dec. 2006.

* cited by examiner

METHOD AND SYSTEM OF CIRCUIT SWITCHED DOMAIN PAGE REALIZATION, METHOD OF SERVICE REALIZATION

CROSS-REFERENCE TO RELATED APPLICATION

This application is the U.S. national phase of PCT Appln. No. PCT/CN2009/070317 filed Jan. 24, 2009 which claims priority to Chinese application 200810065368.0 filed Feb. 3, 2008.

TECHNICAL FIELD

The present invention relates to the field of mobile communication, and in particular, to a method and a system for implementing circuit switched domain paging and a method for service implementation in scenarios where ISR is used.

BACKGROUND OF THE INVENTION

In order to keep the compelling competition capabilities of the 3rd generation mobile communication system in the field of mobile communication system, its network performance must be improved and the network establishment and operation costs must be reduced. Therefore, the standardization working group of the 3rd Generation partnership Project (3GPP) is now working on the evolution of Packet Switched Core (PS Core) network and Universal Mobile Telecommunication System Terrestrial Radio Access Network (UTRAN) in order to enable the evolved PS Core network to provide higher transmission rate with shorter transmission delay, and to support mobility management among evolved UTRAN (E-UTRAN or EUTRAN), GSM EDGE radio access network (GERAN, wherein GSM is the abbreviation of Global System for Mobile communication, EDGE is the abbreviation of Enhanced Data Rate for GSM Evolution), UTRAN, Wireless Local Area Network (WLAN) and other non-3GPP access networks. This evolved mobile telecommunication system is called as Evolved Packet System (EPS), whose basic architecture is as shown in dashed block in FIG. 1. Each entity in FIG. 1 is described as follows:

User Equipment (UE) 101: a terminal capable of accessing two radio networks is called as a dual-mode terminal. The UE described in the present invention is a dual-mode terminal or multi-mode terminal that is capable of accessing a Universal Mobile Telecommunication System (UMTS)/GSM and an EPS networks.

E-UTRAN 102: an evolved radio access network, which can provide higher uplink and downlink rates with lower transmission delay and more reliable wireless transmission than GERAN/UTRAN. E-UTRAN includes network element eNodeB (Evolved NodeB) for providing radio resources for access of the terminal.

Serving Gateway (S-GW) 103: a user-plane entity, responsible for user plane data route processing.

Packet Data Network Gateway (PDN GW or P-GW) 104: responsible for the gateway function of UE accessing a Packet Data Network (PDN). P-GW and S-GW may be implemented in one physical entity.

Mobility Management Entity (MME) 105: a control-plane entity and a server for temporarily storing UE/user data, responsible for managing and storing UE context (for example, UE/user identifier, mobility management state, UE security parameters, etc.), and allocating a temporary identifier for the UE, and authenticating the UE when the UE currently camps in a tracking area or network managed by it.

Home Subscriber Server (HSS) 106: comprises Home Location Register (HLR) function, and stores basic data and service data of the subscriber.

Internet Protocol (IP) Multimedia Core Network Subsystem (IMS): an IP-based network architecture put forth by 3GPP, which establishes an open and flexible service environment, supports multimedia applications and provides rich multimedia services for users. IMS is an IP-based telecommunication network architecture and is irrelevant with access technology. In addition to providing services for the EPS, General Packet Radio Service (GPRS), WLAN and other packet access networks, it also provides services for the GSM, UMTS and other mobile cellular networks.

GERAN/UTRAN 107: the radio access network of legacy GSM/UMTS network.

Mobile Switching Center (MSC)/Visitor Location Register (VLR) 108: the two logically separated units, MSC and VLR, are typically implemented in one physical node in practical implementation and network deployment. The MSC/VLR may also be a new function entity MSC Server since R4 (Release 4) stage, which is uniformly denoted with MSC/VLR in the present invention.

Gateway Mobile Switching Center (GMSC) 109 is included.

Serving GPRS Support Node (SGSN) 110: a control network element of GPRS network, and its main roles are recording location information of the UE, and forwarding mobile packet data between a UE and a Gateway GPRS Supporting Node (GGSN).

When a UE camps on a GSM/UMTS network, the basic voice services and supplementary service based on voice services of the user are provided via Circuit Switched (CS) domain. The MSC/VLR and GMSC in FIG. 1 belong to CS domain network elements, and the user can perform voice call service and other services with users in the same network or other networks (such as fixed telephone network, and other mobile networks) via the CS domain. IP services are provided to the users via Packet Switched (PS) domain. The SGSN in FIG. 1 is a PS domain network element. The UE accesses the Packet Data Network (PDN) via PS domain. The operator's IP services network in FIG. 1 is a PDN.

In GPRS, the interface between MSC/VLR and SGSN is called as Gs interface. Gs interfaces is used for establishment Gs association between MSC/VLR and SGSN (i.e., the SGSN stores the VLR number and the VLR stores the SGSN number), and the MSC/VLR page the called UE via PS domain in the case the Gs association is established.

Gs association is established through combined Routing Area Update (RAU)/Location Area Update (LAU) (or attach/ LAU). The combined RAU/LAU is that when a UE that supports simultaneous attachment to the CS domain and PS domain of GSM/UMTS network performs a RAU (or attach) in the PS domain, the UE includes an indication in the RAU (or attach) message; if the network supports Gs interfaces, the SGSN triggers a CS LAU procedure, and as such, a CS LAU procedure is included in a PS domain RAU procedure, and once the combined RAU/LAU ends, a Gs association is established between the SGSN and the VLR. When the UE moves around in the network, if there is SGSN change, in the VLR, the new SGSN number will be updated via a combined RAU/ LAU procedure.

Once the UE is attached to the CS domain and PS domain of the GSM/UMTS network and a Gs association is established, the MSC/VLR implements paging for CS service(s) via the SGSN. In the present invention, paging for CS service is called as CS domain paging or CS paging. For example, when the user of the UE is called by a user of the local network or other networks, the MSC/VLR pages the UE through the CS paging flow as shown in FIG. 2. The flow is as follows:

201: a user of the UE has a call, and the user is a callee. The MSC/VLR receives the Initial Address Message (i.e., incoming call request) of this call;

202: the MSC/VLR initiates paging the UE. When paging the UE, the MSC/VLR determines that there is a Gs association, then the MSC/VLR sends a CS paging request message to the SGSN recorded in the Gs association;

203: after receiving the CS paging request message, the SGSN sends a corresponding PS paging message to GERAN/UTRAN, the message includes information such as the UE permanent unique identity (or called as International Mobile Subscriber Identity (IMSI)), and there is an identity in the message which indicates that the paging message comes from CS domain. This kind of paging message is also referred to as a CS paging message in the following text of the present invention. For example, when the signaling connection between a SGSN and a Radio access system is an IU connection, a RANAP paging (IMSI, TMSI (Temporary Mobile Subscriber Identity), paging area information, CS domain indication information) message is sent.

204: the GERAN/UTRAN receives the CS paging message, and sends a corresponding radio paging message (a CS paging request message) to the UE via air interface;

205: upon receiving the CS paging request message, the UE accesses CS domain of a GSM/UMTS network, and sends a CS paging response message to the GERAN/UTRAN;

206: upon receiving the CS paging response message, the GERAN/UTRAN sends a CS paging response message, for example, a RANAP Initial UE (paging response) message, to the MSC/VLR.

207: after receiving the CS paging response message, the procedure of establishing a CS call is started between the MSC/VLR and the UE. After the CS call is established, the user of the UE can start to have a conversation with the caller.

When UE camps on an EPS network via E-UTRAN, users' basic voice services and supplementary services which are based on voice service are mainly provided and controlled by IMS, and EPS system itself cannot provide or control voice call services, and can only provide transmission for IP data. However, during EPS network deployment process, some operators, without deploying or unwilling to deploy IMS, may deploy EPS networks to provide high-rate IP data services for the user in the key or hot spots where the GSM/UMTS network is also available. In this scenario, voice call services are desired to be provided and they can only be provided by the CS domain of the fully covered GSM/UMTS network, which means that the user cannot perform voice call service when the UE camps on the EPS network via E-UTRAN. In order to ensure that the user can make a voice call, a simple solution which also is the only one supported by 3GPP currently is that when the user performs a voice call, the UE is switched from accessing via an EPS network to via a GSM/UMTS network, and the voice service is implemented at CS domain of the GSM/UMTS network. This is called Circuit Switched fallback in Evolved Packet System (EPS) (CS fallback, CSFB).

The current method for realizing CS fallback is roughly as follows: Gs interface is introduced between MME and MSC/VLR. When the UE is powered on to access an EPS network via E-UTRAN, a Gs association is established between MME and MSC/VLR (storing the VLR number or address in the MME, and storing the MME number or address in the VLR). The newly introduced interface between MME and MSC/VLR may also be any extension based on Gs interface and principle, for example, SGs interface or Gs like interface, all of which are uniformly denoted with Gs interface. The association between MME and MSC/VLR may also be any extension based on Gs association principle, for example, SGs association or Gs like association, all of which are uniformly denoted with Gs association. Subsequently, when the UE moves around within the EPS network, the latest location information of the UE will be updated in MME, and if the serving MME of the area where the UE is currently located and the serving MME of the area where the UE is previously located are not the same, i.e., an MME change has occurred, then MME information stored in VLR will also be updated in time to the new MME number/address, ensuring that the MME information stored in the VLR is always correct.

When a voice call is performed, if the UE of the callee camps on EPS network via E-UTRAN, MSC/VLR sends a CS paging message to MME via Gs interface after receiving an incoming call request, then the MME performs CS paging after receiving the CS paging message, and the CS fallback take place upon receipt of a Paging Request message for the CS service. After CS fallback, the UE sends a CS paging response via the CS domain of the GSM/UMTS network and starts the process of call establishment with MSC/VLR, and after the call establishment is completed, the user of the UE can start to have a conversation with the caller. The CS paging flow when the UE is a called mobile terminal and it camps on the EPS network via E-UTRAN is as shown in FIG. 3.

301, the UE camps on EPS network via E-UTRAN, a Gs association has been established between MME and MSC/VLR, and the UE has registration information in both the MSC/VLR and the MME. The user of the UE has a call and the user is a callee. GMSC of the GSM/UMTS network where the UE is located performs a routing inquiry process upon receiving the Initial Address Message (IAM) (i.e., an incoming call request) of the call, and forwards the call to MSC/VLR. The MSC/VLR receives the incoming call request of the call;

302, upon receiving the incoming call request, MSC/VLR starts to page the UE of the called user. MSC/VLR sends a CS paging request message to MME according to information such as Gs association stored in VLR;

303-305, upon receiving the CS paging request message from the MSC/VLR, MME initiates a CS paging, and proceeds with the process of CS fallback;

306-308, after the CS fallback is executed, the UE accesses GSM/UMTS network and sends a CS paging response message to GERAN/UTRAN. GERAN/UTRAN sends the CS paging response message to MSC/VLR. The MSC/VLR starts a CS service call termination process.

The above FIG. 2 and FIG. 3 illustrate CS paging flows when the UE in GSM/UMTS network and EPS network respectively without introduction of Idle-mode Signaling Reduction (ISR) function or without activation of ISR, wherein the CS paging flow when the UE is in a GSM/UMTS network is as shown in FIG. 2 and the CS paging flow when the UE is in an EPS network is as shown in FIG. 3. In the circumstance of ISR activation, the UE cannot receive the call in some cases according to the above CS paging flows.

ISR-related concepts and problems of CS paging caused by introduction of ISR will be explained below with reference to FIG. 4 and FIG. 5.

ISR is a mechanism to limit signaling resulting from cell-reselection between Radio Access Technologies (RAT) performed by the UE when it is in idle mode. When the UE is in idle mode in an area overlapped with both GSM/UMTS network and Long Term Evolution (LTE) network, it may frequently switch between GSM/UMTS access mode and LTE access mode due to movement or changes of the intensity of radio signals or other reasons, which will cause frequent RAU (the procedure of the UE updating location in the PS domain of the GSM/UMTS network) and TAU (the procedure of the UE updating location in the EPS network) and will lead to a large amount of signaling interactions between the UE and the network. In order to reduce signaling load on the network brought about by the aforementioned signaling interaction process, one subject currently under study in 3GPP is ISR, the main idea of which is that when both the UE and the networks support ISR function, context information of the UE will be saved in both SGSN and MME, and registration information from these two networks is also saved in the UE, in this way, subsequently, when the UE switches among radio access networks, there will be no need for TAU or RAU.

FIG. 4 and FIG. 5 illustrate the problems of CS paging that need to be solved in the case that ISR is introduced. FIG. 4 illustrates a scenario of the problems, and FIG. 5 is the flow of attach and RAU procedure in the scenario as shown in FIG. 4, wherein ISR is activated in the procedure. The flow is as follows:

In the first step as shown in FIG. 4, a UE attaches in a tracking area 1 (i.e., TA#1 in FIG. 4) of EPS network. In this procedure, the UE sends an attach request to a MME, the MME interacts with the corresponding network elements and generates a tracking area list (e.g., TA#1 and TA#2 in FIG. 4) according to information such as the current Tracking Area Identity (TAI) of the UE, and sends the tracking area list to the UE in attach accept message. Upon receiving the attach accept message, the UE stores the tracking area list and sets the indication which indicates UE has been updated in the EPS network. After the attach procedure is completed, the UE is registered in the EPS network, HSS stores MME identity and VLR number, and what is currently recorded in the Gs association in VLR is MME;

The first step shown in FIG. 4 includes the following parts of attach flow in FIG. 5:

501, the UE performs attach procedure in TA#1 of the EPS network, and sends an attach request message to MME via an eNodeB, wherein the message includes information such as user identity and TA#1;

502, the MME receives the attach request message sent by the UE, and performs operations such as authentication on the UE, then sends an update location request message to HSS, wherein the message includes MME identity and IMSI;

503, after receiving the update location request message sent by the MME, the HSS performs the procedure of insert subscriber data, in which the HSS stores MME identity and IMSI and inserts the subscription data into the MME;

504, after insertion of subscription data is completed, the HSS transmits an update location response message to the MME;

505, according to information that it itself supports Gs interface and the subscription data etc. information, MME determines that it is necessary to send an update message to MSC/VLR, so MME sends a location update request message to MSC/VLR, wherein the message carries information including MME identity and IMSI;

506, MSC/VLR receives the location update request message sent by the MME, and stores the MME identity carried in the message, and a Gs association with the MME is established in the MSC/VLR; MSC/VLR sends the update location request message to HSS, the message includes VLR number and IMSI;

507, HSS receives the update location request message sent by MSC/VLR, and performs the procedure of insert subscriber data, in which HSS stores VLR number and IMSI and inserts the subscription data into the MSC/VLR;

508, when insertion of subscription data is completed, the HSS sends an update location acknowledgement message to the MSC/VLR;

509, after the MSC/VLR completes the procedure of location update, the MSC/VLR sends a location update acknowledgement message to the MME. The MME stores the VLR number information in step 505 or at this moment, and a Gs association with the MSC/VLR is established in the MME;

510, the MME generates a tracking area list based on the current tracking area information etc., wherein the tracking area list generated by the MME in the case as shown in FIG. 4 includes TA#1 and TA#2, the MME sends an attach accept message to the UE, wherein the message includes the above tracking area list and UE identity information allocated for the UE in the MSC/VLR and MME;

The second step shown in FIG. 4 is that when the UE moves from EPS network to a area covered by GSM/UMTS network, UE performs cell reselection due to reasons such as signal quality, accessing from GSM/UMTS network routing area 1 (i.e., RA#1 in FIG. 4) and performs a combined RAU/LAU procedure. In this procedure, since SGSN, MME and UE all support ISR function, ISR is activated, MME continues to store the data such as UE context, SGSN sends a combined RAU accept message which includes an ISR activation indication to the UE, and UE receives the message, identifying that UE registers in both EPS network and PS domain of GSM/UMTS network. After combined RAU/LAU is completed, ISR is activated, UE has registered in both PS domain of GSM/UMTS network and EPS network, wherein it registers in tracking areas TA#1 and TA#2 in the EPS network and registers in RA#1 in the PS domain of GSM/UMTS network, HSS stores information including MME identity, SGSN number and address and VLR number, and what is currently stored in Gs association in VLR is SGSN number;

The second step shown in FIG. 4 includes the following parts of the combined RAU/LAU flow in FIG. 5:

511, the UE moves from TA#1 of E-UTRAN to RA#1 of GERAN/UTRAN to access the networks, and since RA#1 does not register in the network, the UE sends a RAU request message to SGSN, wherein the message includes network capability of UE, UE location information, UE identity information and combined RAU/LAU indication. Network capability of UE includes an ISR indication, which indicates that the UE supports ISR function;

512, SGSN deduces MME address information according to information such as UE location included in the RAU request message, and sends a context request message to the MME, wherein the message includes UE and the current SGSN address. According to the requirements of the latest prior art, SGSN needs to store MME address information, so here the SGSN may store the MME address information;

513, after receiving the context request message, the MME transmits a context response message to the SGSN, sending the stored context information to the SGSN. If the MME is able to activate ISR for this UE, then the message includes ISR identity information. According to the requirements of the latest prior art, MME needs to store SGSN address information, so here, the MME may store the SGSN address information included in the received context request message;

514, the SGSN sends a context acknowledgement message to the MME, wherein the message includes ISR identity, indicating that the SGSN also supports ISR function and ISR activation condition is satisfied, so ISR function is activated, indicating the MME to continue store information such as context of the UE. If the message does not include ISR identity, the MME will mark that the information in HSS and S-GW are invalid;

515, the SGSN sends an update location request message to HSS, wherein the message carries information including SGSN number, SGSN address and IMSI;

516, after receiving the update location request message sent by the SGSN, the HSS performs procedure of insert subscriber data, in which the HSS stores SGSN number, SGSN address and IMSI, and inserts the subscription data into the SGSN;

517, when insertion of subscription data is completed, the HSS sends an update location acknowledgement message to the SGSN;

518, the SGSN sends a location update request message to MSC/VLR according to the facts that Gs interface is supported and the current update is combined routing area/location area update, wherein the message includes information such as SGSN number and IMSI. After receiving the location update request message sent by SGSN, the MSC/VLR stores the SGSN number, and at this moment, a Gs association with the SGSN is established in the MSC/VLR;

519-521, if the current location area of the UE in the GSM/UMTS network and the location area when it is in the EPS network belong to different MSC/VLRs, MSC/VLR interacts with HSS to perform operations such as insert subscriber data, HSS inserts the subscription data into the new MSC/VLR, and new VLR number and UE location information are stored in the HSS, while the UE information in the old MSC/VLR will be deleted. If MSC/VLR does not change, then the processes in steps 519-521 will not be performed;

522, after completing the procedure of location update, the MSC/VLR sends a location update acknowledgement message to the SGSN. The SGSN stores VLR number in step 518 or at this moment, and a Gs association with the MSC/VLR is established in the SGSN;

523, the SGSN sends a RAU accept message to the UE, wherein the message includes ISR identity information, which tells the UE that currently ISR is already activated, the registration information of the UE in EPS network (e.g., the tracking area list and identity of the UE allocated in EPS network) is remained valid in the network, and the registration information of the UE in the EPS network should also be remained valid in the UE. At this moment, UE registers in both EPS network and PS domain of GSM/UMTS network. If the RAU accept message does not include ISR identity information, this indicates that ISR is not activated, and UE will set the registration information in EPS network to be invalid upon receiving the RAU accept message, then the UE registers only in the PS domain of GSM/UMTS network;

Now, the UE is in a state that in both MME and SGSN the UE are registered and ISR is activated (i.e. ISR is active). If the UE subsequently moves to a legacy SGSN (e.g., a SGSN before Version 8) network that does not support ISR function, ISR function will become inactivated, the UE information etc. in the EPS network will be deleted by MME, and it will also be set in the UE that EPS network is not registered, i.e., the UE only registers in PS domain of GSM/UMTS network. If, afterwards, the UE moves from this network area controlled by SGSN that does not support ISR function to a network area controlled by SGSN and MME that supports ISR function, ISR function will change from being inactivated to being activated after performing RAU and TAU.

As described above, ISR being activated means that in the case that UE and the networks both support ISR function, the UE stores information on the registration of UE in both EPS and GSM/UMTS networks, and MME and SGSN both store UE information and ISR activation indication, and the MME has an ISR relation with the SGSN for the UE (also named as ISR-associated). ISR being inactivated means that only information on registration of UE in EPS or PS domain of GSM/UMTS is kept valid in the UE, and only MME or SGSN keeps the UE information valid. When the UE moves at an edge covered by several networks or in an area where several networks overlap, ISR function may constantly change between being activated and being inactivated.

The third step in FIG. 4 is that: when the UE moves from RA#1 of GSM/UMTS network to TA#2 of EPS network, since UE has registered in the EPS network, and the current tracking area TA#2 is in the registered tracking area list stored by the UE, the UE will not initiate TAU any more when ISR is activated according to the prior art, and thus the Gs association stored in the MSC/VLR will not be updated. In other words, when the UE accesses in TA#2, the UE camps on an EPS network via E-UTRAN, the Gs association in VLR should record MME information, but actually what is recorded in the Gs association in VLR is SGSN number.

When the UE subsequently moves between TA#1, TA#2, and RA#1, the UE will not initiate TAU or RAU any more, so the networks will not know whether the UE is currently in an EPS network or in a GSM/UMTS network. Assuming that when the UE is in TA#2, the user of the UE has a call and the user is the called user, and MSC/VLR needs to page UE via Gs interface, MSC/VLR will send a CS paging to SGSN according to the Gs association recorded in VLR, and the SGSN will trigger a paging in PS domain of GSM/UMTS network, but since the UE currently only camps on the EPS network via E-UTRAN, UE cannot receive the paging in the PS domain of GSM/UMTS network, i.e., the user of the UE is unable to receive the CS call in this case.

In the scenario as shown in FIG. 4, if UE is in RA#1, MSC/VLR needs to control CS paging performed in GERAN/UTRAN via SGSN; if UE is in TA#1 or TA#2, MSC/VLR needs to control CS paging performed in E-UTRAN via MME. However, when the CS paging is performed in the case of ISR activated, the network cannot determine whether the UE currently camps on E-UTRAN or GERAN/UTRAN, therefore, it needs to page UE via E-UTRAN and GERAN/UTRAN in order that the UE receives the CS paging.

A method for solving CS paging in ISR activated case in the prior art is that two Gs associations with SGSN and MME respectively are stored in MSC/VLR, and when CS paging needs to be performed, as shown in FIG. 6, MSC/VLR sends a CS paging message to SGSN and MME respectively according to the two Gs associations stored in VLR, and SGSN and MME respectively initiate a CS paging procedure in GERAN/UTRAN and E-UTRAN.

However the solution has the following requirements and problems: MSC/VLR needs to store two Gs associations with SGSN and MME respectively; both SGSN and MME need to send ISR identity information etc. to MSC/VLR when performing RAU and TAU, which changes the existing interface; MSC/VLR needs to process differently according to two situations of ISR being activated and being inactivated in a location update message; MSC/VLR needs to deal with various cases of changes between ISR being activated and being inactivated that may be caused due to UE accessing in different network areas controlled by different SGSN and MME; MSC/VLR needs to initiate two CS paging procedures when performing CS paging; if an embodiment in which MSC/VLR does not need to know whether ISR is activated or not is adopted, and if UE has camped in both EPS via E-UTRAN and GSM/UMTS networks, MSC/VLR will store and maintain two associations even if in the case that ISR is not activated, until MME or SGSN sends an informing message to the MSC/VLR due to the reason that MME or SGSN does not interact with the UE for a long time or the UE is detached from the network, or the MSC/VLR does not delete invalid association information and end the corresponding processing unless the MSC/VLR fails in CS paging via MME or SGSN. The CS paging solution in which MSC/VLR maintains two Gs associations and initiates two paging procedures does not only need to upgrade MSC software when implemented, but may also increase requirement of capacity and signaling processing capability of MSC/VLR. Moreover, if the UE can not be served by the same MSC/VLR when the UE camps in EPS network via E-UTRAN, or in GSM/UMTS network, it will not be possible to store both Gs associations with MME and SGSN in the corresponding MSC/VLRs to MME or SGSN. The above requirements all increase the complexity of MSC/VLR, and in a scenario that the network needs to support both ISR and CS fallback, the operator has to upgrade the MSC/VLR in existing network, which may have risks and affect user experience during upgrade. If MSC/VLR need to be upgraded to increase its capacity and signaling processing capability, costs will be increased for device providers and operators, thus affecting commercial application of techniques such as CS fallback and ISR, as well as EPS network.

SUMMARY OF THE INVENTION

Based on the above problem, the present invention provides a method and a system for implementing Circuit Switched (CS) domain paging, and a method for service implementation after Idle-mode Signaling Reduction (ISR) function is introduced in order to solve the problem of CS domain paging caused by introduction of ISR function. The present invention doesn't require Mobile Switching Center (MSC)/Visitor Location Register (VLR) to process ISR-related information.

In order to solve the above problem, the present invention provides a method for implementing CS domain paging, applied in the scenarios that the CS domain paging is performed for a called User Equipment (UE) after ISR function is introduced in Packet Switched (PS) domains, comprising:

a MSC/VLR only storing one Gs association;

when performing the CS domain paging, the MSC/VLR sending a CS domain paging request message to the PS domain network element recorded in the Gs association in the MSC/VLR; and after receiving the CS domain paging request message, the PS domain network element initiating one or two CS paging procedures in PS domain to transmit the CS paging to the called user equipment; or the PS domain network element sending a paging response to the MSC/VLR directly without initiating CS domain paging.

Furthermore, the above method may have the following features: the PS domain radio access network includes GERAN/UTRAN and E-UTRAN, the CS domain pagings are transmitted via the GERAN/UTRAN and the E-UTRAN to the called UE, or via the GERAN/UTRAN to the called UE, or via the E-UTRAN to the called UE.

Furthermore, the above method may have the following features: the PS domain network element is a Mobility Management Entity (MME), or a Serving General packet radio service Support Node (SGSN), or a Serving Gateway (S-GW).

Furthermore, the above method may have the following features: when ISR is activated, the PS domain network element initiates the CS domain paging procedures to be performed respectively in the GERAN/UTRAN and the E-UTRAN upon receiving the CS domain paging request message;

or, when the PS domain network element is able to know the information about on which network of the GERAN/UTRAN and the E-UTRAN the called UE camps, the PS domain network element only initiates the CS domain paging to be performed in the network where the called UE camps.

Furthermore, the above method may have the following features:

if the PS domain network element is a MME, the MME initiates the CS domain paging in the E-UTRAN and sends a CS domain paging message to an ISR-associated Serving General packet radio service Support Node (SGSN) to inform the SGSN to initiate the CS domain paging in the GERAN/UTRAN;

if the PS domain network element is a SGSN, the SGSN initiates the CS domain paging in the GERAN/UTRAN, and sends a CS domain paging message to an ISR-associated MME to inform the MME to initiate the CS domain paging in the GERAN/UTRAN;

if the PS domain network element is a Serving Gateway (S-GW), the S-GW sends the CS domain paging message to a MME and a SGSN serving UE respectively to inform the MME to initiate the CS domain paging in the E-UTRAN and to inform the SGSN to initiate the CS domain paging in the GERAN/UTRAN;

if the PS domain network element is a MME and the called UE camps on the E-UTRAN, the MME initiates the CS domain paging in the E-UTRAN;

if the PS domain network element is a MME and the called UE camps on GERAN/UTRAN, the MME sends a CS domain paging message to an ISR-associated SGSN to inform the SGSN to initiate the CS domain paging in the GERAN/UTRAN;

if the PS domain network element is a SGSN and the called UE camps on E-UTRAN, the SGSN sends a CS domain paging message to an ISR-associated MME to inform the MME to initiate the CS domain paging in the E-UTRAN;

if the PS domain network element is a SGSN and the called UE camps on the GERAN/UTRAN, the SGSN initiates the CS domain paging in the GERAN/UTRAN;

if the PS domain network element is a S-GW and the called UE camps on E-UTRAN, the S-GW sends a CS domain paging message to a MME serving the UE to inform the MME to initiate the CS domain paging in the E-UTRAN;

if the PS domain network element is a S-GW and the called UE camps on GERAN/UTRAN, the S-GW sends a CS domain paging message to a SGSN serving the UE to inform the SGSN to initiate the CS domain paging in the GERAN/UTRAN.

The present invention also provides a system for controlling Circuit Switched (CS) domain paging, applied in the scenario that the CS domain paging is performed on a called User Equipment (UE) after ISR function is introduced in Packet Switched (PS) domains, comprising:

a CS domain paging initiating module, which is located in a MSC/VLR, and used for sending a CS domain paging message to the PS domain network element recorded in the Gs association via Gs interface, wherein the MSC/VLR only keeps one Gs association with one PS domain network element;

a CS domain paging deciding and forwarding module, which is located in a MME, or a SGSN, or a S-GW, and used for determining that the CS domain paging is transmitted via GERAN/UTRAN and E-UTRAN to the called UE, or via the GERAN/UTRAN to the called UE, or via the E-UTRAN to the called UE; and a CS domain paging executing module, which is located in the MME and/or the Serving GPRS Support Node (SGSN) and radio access network(s), and used for executing CS domain paging procedure(s).

The present invention also provides a system for implementing CS domain paging, comprising a MSC/VLR and PS domain, wherein the PS domain comprises PS domain network elements and radio access network(s), wherein:

the MSC/VLR only stores one Gs association, and is used to send a CS domain paging request message to the PS domain network element recorded in the Gs association in a process of CS domain paging;

the PS domain network element is used to initiate one or two CS domain paging procedures in PS domain after receiving the CS domain paging request message to transmit the CS domain paging to the called User Equipment (UE); or the PS domain network element is used to send a CS paging response to the MSC/VLR directly without initiating CS domain paging.

Furthermore, the above system may have the following features: the PS domain Radio access network includes GERAN/UTRAN and E-UTRAN, the CS domain paging is transmitted via the GERAN/UTRAN and the E-UTRAN to the called UE, or via the GERAN/UTRAN to the called UE, or via the E-UTRAN to the called UE.

Furthermore, the above system may have the following features: when ISR is activated, the PS domain network element is used to initiate the CS domain paging to be performed respectively in the GERAN/UTRAN and E-UTRAN upon receiving the CS domain paging request message;

or, when the PS domain network element is able to know the information about on which network of the GERAN/UTRAN and the E-UTRAN the called UE camps, the PS domain network element is used to only initiate a CS domain paging in the network where the called UE camps.

Furthermore, the above system may have the following features: the PS domain network element is a MME, and the MME initiates the CS domain paging in the E-UTRAN and sends a CS domain paging message to an ISR-associated SGSN to inform the SGSN to initiate the CS domain paging in the GERAN/UTRAN;

or, the PS domain network element is a SGSN, and the SGSN initiates the CS domain paging in the GERAN/UTRAN, and the SGSN sends a CS domain paging message to an ISR-associated MME to inform the MME to initiates the CS domain paging in the E-UTRAN;

or, the PS domain network element is a S-GW, and the S-GW sends the CS domain paging message to a MME and a SGSN serving the UE respectively to inform the MME to initiate the CS domain paging in the E-UTRAN and to inform the SGSN to initiate the CS domain paging in the GERAN/UTRAN;

or, the PS domain network element is a MME, and when the called UE camps on the E-UTRAN, the MME initiates the CS domain paging in the E-UTRAN; or when the called UE camps on GERAN/UTRAN, the MME sends a CS domain paging message to an ISR-associated SGSN to inform the SGSN to initiate the CS domain paging in the GERAN/UTRAN;

or, the PS domain network element is a SGSN, and when the called UE camps on E-UTRAN, the SGSN sends a CS domain paging message to an ISR-associated MME to inform the MME to initiate the CS domain paging in the E-UTRAN; or when the called UE camps on GERAN/UTRAN, the SGSN initiates the CS domain paging in the GERAN/UTRAN;

or, the PS domain network element is a S-GW, and when the called UE camps on E-UTRAN, the S-GW transmits the CS domain paging message to a MME serving the UE to inform the MME to initiate the CS domain paging in the E-UTRAN; or when the called UE camps on GERAN/UTRAN, the S-GW transmits the CS domain paging message to a SGSN serving the UE to inform the SGSN to initiate the CS domain paging in the GERAN/UTRAN.

The present invention also provides a method for transferring service information, applied in the scenarios that ISR is activated in PS domain, comprising:

transferring service information by transmitting service message(s) between ISR-associated PS domain network elements which serve a User Equipment (UE).

Furthermore, the above method may have the following features: the service information is transferred in unidirectional or bidirectional; when transferred in bidirectional, the service message(s) can be transmitted in both direction between the ISR-associated PS domain network elements serving the UE; when transferred in unidirectional, the service message(s) can only be transmitted from one of the ISR-associated PS domain network elements serving the UE to the other.

Furthermore, the above method may have the following features: the ISR-associated PS domain network elements serving the UE are a MME and a SGSN; the service information is transferred in unidirectional or bidirectional;

when the service information is transferred in bidirectional or only in unidirectional from the MME to the SGSN, upon receiving a service message, the MME transmits the service message to the ISR-associated SGSN so as to transfer the service information to the SGSN;

or, when the service information is transferred in bidirectional or only in unidirectional from the SGSN to the MME, upon receiving a service message, the SGSN transmits the service message to the ISR-associated MME so as to transfer the service information to the MME.

Furthermore, the above method may have the following features: when the method is applied in the scenarios that Circuit Switched (CS) domain paging is performed for a called User Equipment, the service message is a CS domain paging;

the MME transmits the CS domain paging message to the ISR-associated SGSN upon receiving from Mobile Switching Center/Visitor Location Register (MSC/VLR), or the SGSN transmits the CS domain paging message to the ISR-associated MME upon receiving from the MSC/VLR.

Compared with the current technology, the method of the present invention implements CS domain paging after introduction of ISR function, which does not only satisfy the application requirements for correctly performing CS domain paging in various situations, but also enables MSC/VLR processing to remain same as it was before, and without needing to understand and process ISR-related information or participate in ISR activation procedure, hence no need to upgrade MSC/VLR in the existing network to support CS fallback in ISR used scenarios, thus reducing operation costs and risks of upgrading the existing network, ensuring applicability of GSM/UMTS network CS domain, and meanwhile reducing deployment costs of an EPS network, which is favorable for fast popularization of EPS network.

PREFERRED EMBODIMENTS OF THE INVENTION

The method for implementing CS domain paging according to the present invention will be further described in detail below with reference to the accompanying drawings.

The present invention provides a method for implementing CS domain paging, in which, after ISR function is introduced, MSC/VLR only stores a Gs association with one PS domain network element, generally with the latest PS domain network element (MME or SGSN or S-GW) which sends a location update message to the MSC/VLR. When performing CS paging, MSC/VLR sends a paging message to the PS domain network element according to the Gs association stored in itself, and the paging process is as shown in FIG. 7.

Figure 7:
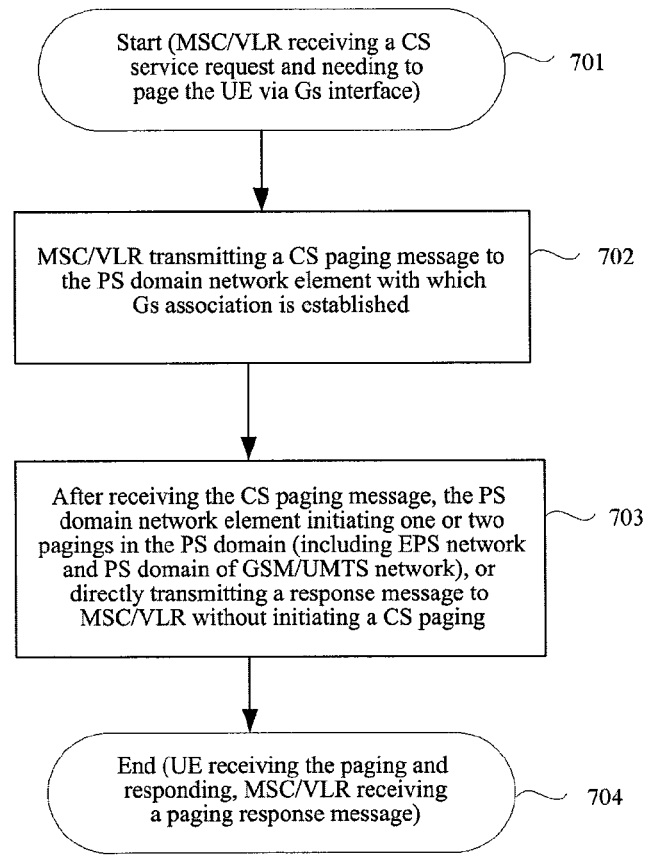
FIG. 7 is a flow of CS paging according to the present invention.

FIG. 7 illustrates the flow of the method provided by the present invention for CS paging after ISR function is introduced. In this flow, after a UE accesses in PS domain and a Gs association is established between MSC/VLR and a PS domain network element, when performing CS services such as call, short message, etc., the MSC/VLR can always send the CS paging to the mobile terminal of the called user via PS domain, thus ensuring CS services such as call, short message, etc. to be performed. The flow is as follows:

701, after a UE accesses an EPS network and/or a PS domain of GSM/UMTS network, MSC/VLR receives a CS service request, for example, a user of the UE has a call and the user is a callee, the MSC/VLR receives an incoming call request of this call. The MSC/VLR needs to page the UE via Gs interface, and the flow starts;

702, the MSC/VLR sends a CS paging request message to the PS domain network element which is currently stored in the Gs association in the VLR;

703, upon receiving the CS paging request message sent by the MSC/VLR, the PS domain network element performs CS paging in PS domain (including EPS network and PS domain of GSM/UMTS network), wherein the paging process may be that two paging procedures are simultaneously performed in two networks, or two paging procedures are sequentially performed in two networks, or only one paging procedure is performed in one network, or the PS domain network element directly sends a response message to the MSC/VLR without performing paging according to configurations and/or state;

704, upon receiving the CS paging when the UE camps on E-UTRAN or UTRAN or GREAN, the UE performs a processing flow of CS fallback, or the UE accesses the GSM/UMTS network CS domain, and sends a CS paging response message to the MSC/VLR, or sends a response message to a MME and the MME sends the response message to the MSC/VLR, and the flow ending.

When the method as shown in FIG. 7 is specifically implemented, the PS domain network element needs to process differently according to the acquired information when receiving the CS paging request message from the MSC/VLR.

When ISR is not activated, same with the processing in the prior art, only one CS paging procedure in the network where the PS domain network element is located is initiated or no CS paging is initiated. When ISR is activated, two CS paging procedures may be triggered to perform in GSM/UMTS and EPS networks, or only one CS paging procedure is performed in one of the networks, or no CS paging is initiated, according to specific situations.

FIGS. 8, 9, 10, 11, 12, 13 and 14 are the first example of the present invention, wherein two paging procedures are performed in parallel in PS domain, and the method is applied to CS paging in the case that ISR is activated. SGSN and MME interact with their ISR-associated control counterpart (MME or SGSN), according to information of their counterpart which is acquired in the TAU and RAU procedure or acquired by inquiring HSS, to inform their counterpart in order to start CS paging processes in parallel in the two networks. S-GW sends a CS domain paging message to the MME and SGSN to inform the MME and SGSN to initiate a CS domain paging respectively.

The first example is a method for simultaneously performing two CS paging procedures in parallel. When performing CS paging in two networks, paging may be firstly initiated in one network, and if the UE is not reachable in this network, the paging process in another network is then initiated, and CS service processing time such as call establishment time in this method may be relatively longer comparing with the method of simultaneously performing CS paging procedures in parallel as described in the first example. The method of performing two CS paging procedures in two networks of PS domain applies to the situation in which the UE is in idle state in both networks or is in idle state in one of the networks and is in connected state in another.

Figure 8:
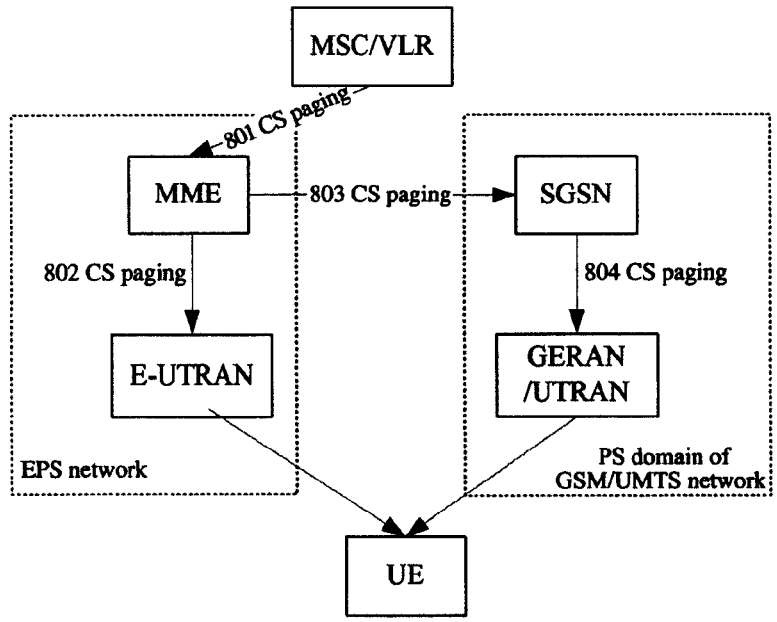
FIG. 8 illustrates the processing in PS domain when MSC/VLR sends a CS paging request message to MME according to Gs association in the present invention.

FIG. 8 illustrates the processing in PS domain when MSC/VLR sends a CS paging request message to MME according to Gs association. The figure illustrates how MME triggers two CS paging procedures to be performed in parallel in EPS network and GSM/UMTS network. The method is as follows:

801: what is currently recorded in the Gs association in MSC/VLR is a MME. When receiving a CS service request such as an incoming call request, the MSC/VLR sends a CS paging request message to the MME;

802: after receiving the CS paging request message sent by the MSC/VLR, the MME sends CS paging request message(s) to eNodeB(s) to start CS paging for the UE in E-UTRAN. In implementations, the CS paging request message can also be a CS service notification message, and the CS paging request or the CS service notification message can be indicated as a CS service paging by various ways such as CS domain paging indication or service type information or paging reason;

803: MME forwards the CS paging request to the corresponding SGSN according to SGSN information acquired during ISR activation in the TAU procedure or acquired by inquiring HSS. The CS paging request may be implemented by adding an indication into the existing message or adding a new message;

804: after receiving the CS paging request sent by the MME, the SGSN sends CS paging request(s) to GERAN/UTRAN to start paging the UE in the GERAN/UTRAN.

In the method as shown in FIGS. 8, 802 and 803 are executed in parallel, maybe, simultaneously or sequentially, or 803 is prior to 802.

Figure 9:
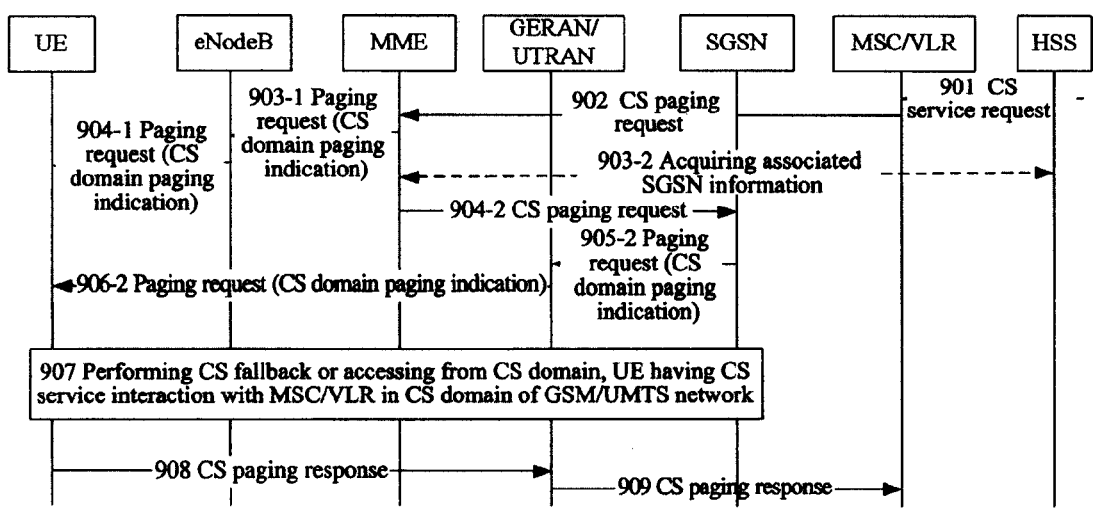
FIG. 9 is a processing flow in PS domain when MSC/VLR sends a CS paging request message to a MME according to Gs association in the present invention.

FIG. 9 is a processing flow in PS domain when MSC/VLR sends a CS paging request message to a MME according to the Gs association, i.e., an implementing flow chart of FIG. 8. The flow is as follows:

901: MSC/VLR receives a CS service request, for example, an Initial Address Message of a call (i.e., an incoming call request). The calling party of the incoming call request may be a user of any type such as a fixed-network user, a mobile user, etc.

902: after receiving the incoming call request, the MSC/VLR sends a CS paging request message to a MME according to the current Gs association;

903-1, 904-1 and 903-2, 904-2, 905-2, 906-2 are executed in parallel.

903-1: after receiving the CS paging request message sent by the MSC/VLR, according to the stored information with respect to the UE, the MME sends the paging request to one or all eNodeB(s) serving the network area(s) where the UE may be located currently to request the eNodeB(s) to page the UE; or the MME sends CS service notification message to one or all eNodeB(s) serving the area(s) where the UE may be located currently;

904-1: each eNodeB that has received the CS paging request or service notification message starts to page UE via air interface or sends the CS paging request or service notification message to the UE via an existing signaling connection;

903-2: if the MME determines, according to the stored ISR activation indication information, that ISR is currently activated, then it interacts with HSS to acquire ISR-related SGSN information. If MME has stored ISR-associated SGSN information when ISR is activated in the TAU procedure, this step can be skipped;

904-2: after obtaining the SGSN information, MME sends the CS paging request to SGSN to request it to start to page the UE within GERAN/UTRAN;

905-2: after receiving the CS paging request, SGSN sends CS paging request(s) to GERAN/UTRAN to request the GERAN/UTRAN to start to page UE;

906-2: after receiving the CS paging request, the GERAN/UTRAN pages the UE via radio interface in the area where the UE is currently located or all the areas where the UE may be located;

907: if the UE camps on E-UTRAN when it receives the CS paging, it performs CS fallback procedure of call or other CS services; after CS fallback, UE accesses CS domain of GERAN/UTRAN to perform CS services such as a voice call; if the UE camps on UTRAN or GERAN when it receives the CS paging, the UE accesses CS domain of GERAN/UTRAN to perform CS services such as a voice call;

908: UE sends a CS paging response to GERAN/UTRAN;

909: after receiving the CS paging response, GERAN/UTRAN sends the CS paging response to MSC/VLR, and then the MSC/VLR starts the CS service mobile terminating processing after receiving the CS paging response.

Figure 10:
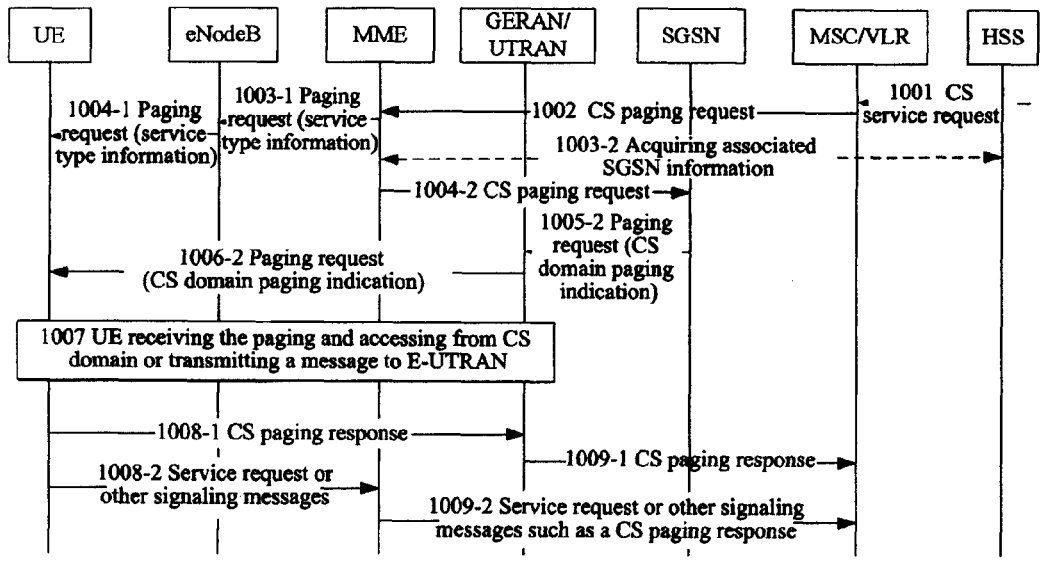
FIG. 10 is another processing flow in PS domain when MSC/VLR sends a CS paging request message to a MME according to Gs association in the present invention, wherein UE performs CS service(s) in EPS network when the UE receives paging in the E-UTRAN.

FIG. 10 is another processing flow in PS domain when MSC/VLR sends a CS paging request message to a MME according to Gs association, wherein UE will perform the CS service(s) in EPS network when it receives a paging in the EPS network, i.e., another implementing flow of FIG. 8. The flow is as follows:

1001: MSC/VLR receives a CS service (e.g. Short Message Service, SMS) request;

1002: after receiving the CS service request, the MSC/VLR sending a CS paging request message to a MME according to the current Gs association;

1003-1, 1004-1 and 1003-2, 1004-2, 1005-2 and 1006-2 are executed in parallel.

1003-1: after receiving the CS paging request sent by the MSC/VLR, the MME sends paging request to one or all eNodeB(s) serving the area where the UE currently may be located according to related information of UE stored in itself to request the eNodeB(s) to page the UE; or MME sends a CS service notification message to one or all eNodeB(s) serving the area where the UE currently may be located;

1004-1: each eNodeB that has received the paging request or CS service notification message starts to page UE via air interface or transmits the paging request or service notification message to the UE via an existing signaling connection;

1003-2: MME determines according to the ISR activation indication information stored in itself that ISR is currently activated, and interacts with HSS to acquire the ISR-associated SGSN information. If MME has stored SGSN information when ISR is activated in the TAU procedure, this step can be skipped;

1004-2: after obtaining SGSN information, MME transmits the CS paging request to SGSN to request it to start to page UE within GERAN/UTRAN;

1005-2: after receiving the CS paging request, SGSN transmits the CS paging request to GERAN/UTRAN to request the GERAN/UTRAN to start to page UE;

1006-2: after receiving the CS paging request, the GERAN/UTRAN pages UE in the area where the UE is currently located or all areas where the UE may be located;

1007: if the UE camps on E-UTRAN when it receives paging or service notification, the UE sends a service request or other responsive signaling messages to the MME; if the UE camps on GERAN or UTRAN when it receives the CS paging, the UE accesses CS domain from GERAN/UTRAN to perform CS service(s);

1008-1: UE sends a CS paging response to GERAN/UTRAN;

1009-1: after receiving the CS paging response, GERAN/UTRAN transmits the CS paging response to the MSC/VLR, and then the MSC/VLR starts a CS service mobile terminating process after receiving the CS paging response.

1008-2: UE sends a service request or other responsive signaling messages to the MME;

1009-2: the MME transmits the service request or other signaling messages such as a CS paging response to the MSC/VLR, and then the MSC/VLR starts a CS service mobile terminating process after receiving the service request or other signaling message such as CS paging response.

Figure 11:
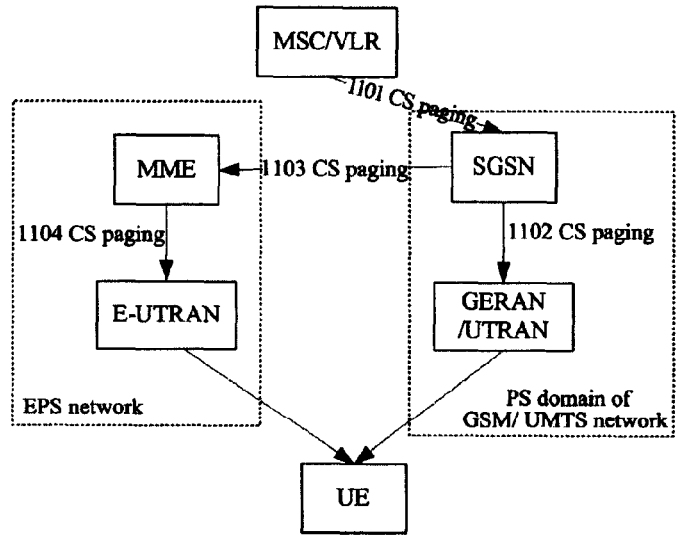
FIG. 11 illustrates the processing in PS domain when MSC/VLR sends a CS paging request message to a SGSN according to Gs association in the present invention.

FIG. 11 illustrates the processing in PS domain when MSC/VLR sends a CS paging request message to a SGSN according to Gs association. The figure illustrates how SGSN triggers two CS paging procedures to be performed in parallel in GSM/UMTS network and EPS network. The method is as follows:

1101: what is currently recorded in the Gs association in MSC/VLR is a SGSN. When receiving a CS service request such as an incoming call request, the MSC/VLR sends a CS paging request message to the SGSN via Gs interface;

1102: after receiving the CS paging request message sent by the MSC/VLR, the SGSN sends the CS paging request message to GERAN/UTRAN to start paging UE in GERAN/UTRAN;

1103: SGSN sends the CS paging request message to the corresponding MME according to MME information acquired during ISR activation in the RAU procedure or acquired by inquiring HSS. Wherein the CS paging request may be implemented through adding an indication into the existing message or adding a new message;

1104: after receiving the CS paging request message sent by the SGSN, MME sends the CS paging request to the serving eNodeB(s) to start paging UE in the E-UTRAN. In implementation, the CS paging request message can also be a CS service notification message, and the CS paging request or the CS service notification message can be indicated as a CS service paging in various ways such as CS domain paging indication or service type information or paging reason;

In the method as shown in FIGS. 11, 1102 and 1103 are executed in parallel, maybe simultaneously or sequentially, or 1103 is prior to 1102.

Figure 4:
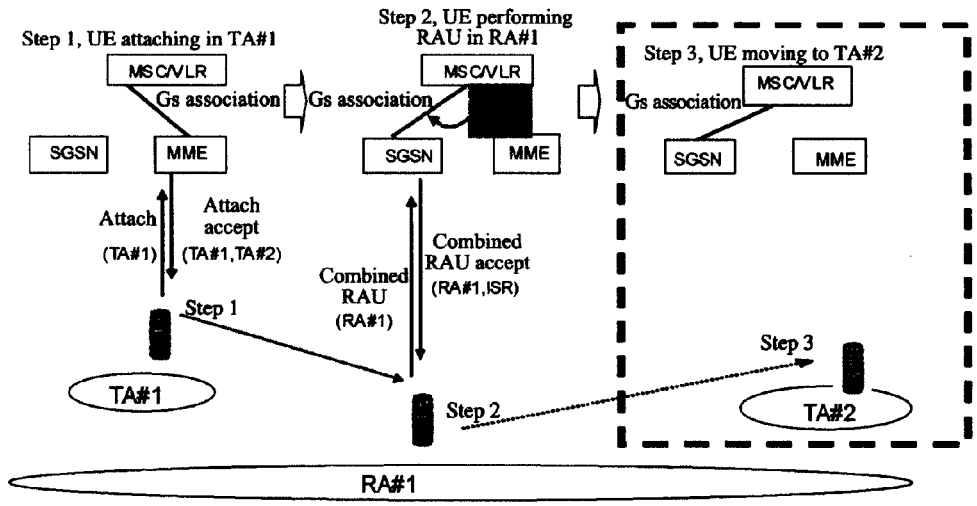
FIG. 4 illustrates a scenario of a problem to be solved in CS paging in a case that ISR is activated.
Figure 5:
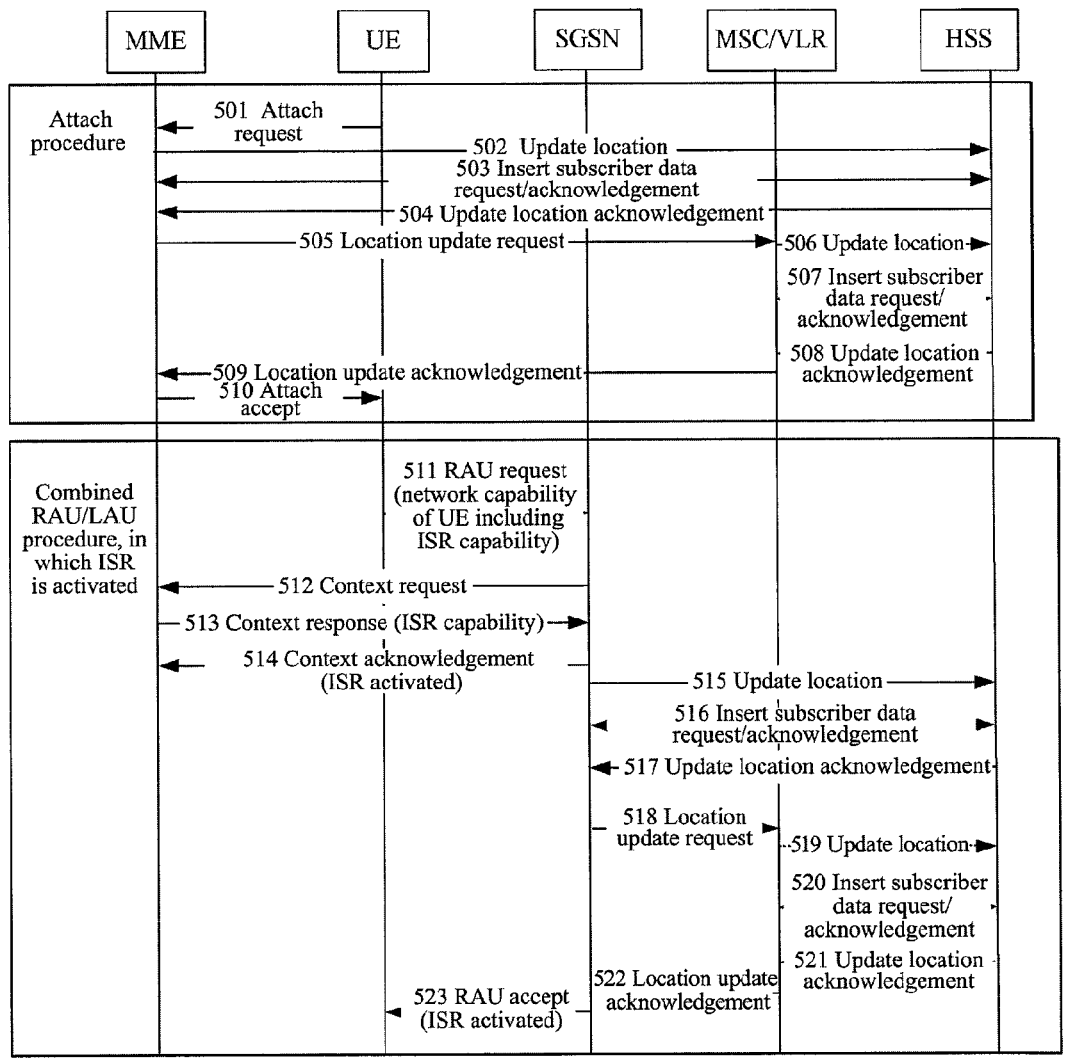
FIG. 5 is a flow of attach and RAU related with the problem as shown in FIG. 4.
Figure 6:
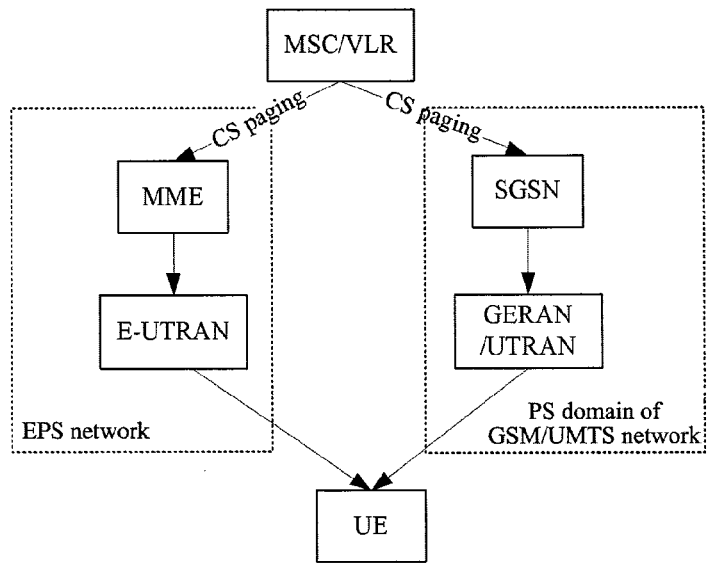
FIG. 6 illustrates a method for implementing CS paging after ISR function is introduced.
Figure 12:
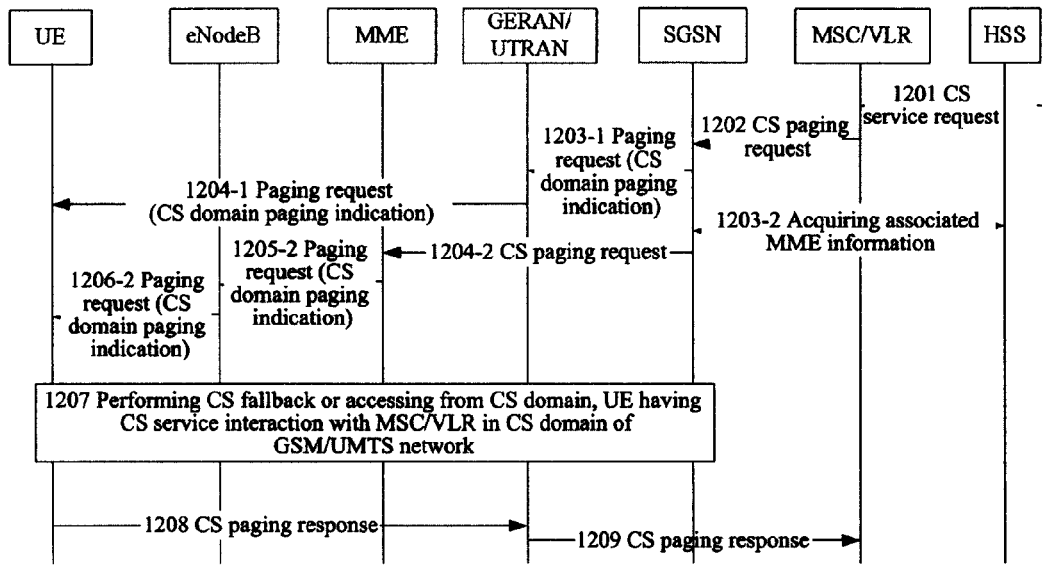
FIG. 12 is a processing flow in PS domain when MSC/VLR sends a CS paging request message to a SGSN according to Gs association in the present invention.

FIG. 12 is a processing flow in PS domain when MSC/VLR sends a CS paging request message to a SGSN according to Gs association, i.e., an implementing flow for applying the first example of the present invention to the scenario as shown in FIG. 4. The flow is as follows:

1201: MSC/VLR receives a CS service request, for example, an Initial Address Message of a call (i.e., an incoming call request). The calling party of the incoming call request may be a user of any type such as, a fixed-network user, a mobile user, etc.

1202: after receiving the incoming call request, the MSC/VLR sends a CS paging request message to SGSN according to the current Gs association;

1203-1, 1204-1 and 1203-2, 1204-2, 1205-2, 1206-2 are executed in parallel.

1203-1: after receiving the CS paging request message, the SGSN sends CS paging request message to GERAN/UTRAN to request the GERAN/UTRAN to start paging the UE;

1204-1: after receiving the CS paging request message, the GERAN/UTRAN performs CS paging via radio interface in an area where the UE is currently located or all areas where the UE may be located;

1203-2: If SGSN determines according to its stored ISR activation indication information that ISR is currently activated, it interacts with HSS to acquire related MME information. If SGSN has stored the ISR-associated MME information during ISR activation in the RAU procedure, this step can be skipped;

1204-2: after obtaining the MME information, SGSN sends CS paging request to the MME to request it to start paging the UE within E-UTRAN;

1205-2: after receiving the CS paging request sent by the SGSN, MME sends paging request to eNodeB(s) serving the area where the UE is currently located or all eNodeB(s) serving the area(s) where the UE currently may be located, according to related information of UE stored by itself, to request the eNodeB(s) to page the UE; or MME transmits a CS service notification message to one or all serving eNodeB(s) where the UE currently may be located;

1206-2: each eNodeB that has received the CS paging request starts to page UE via air interface or transmits the CS paging request or service notification message to the UE via an existing signaling connection;

1207: if the UE camps on E-UTRAN when it receives paging, CS fallback procedure is performed; after CS fallback, UE accesses CS domain of GERAN/UTRAN to perform CS service(s); if the UE camps on GERAN or UTRAN when it receives paging, UE accesses CS domain of GERAN/UTRAN to perform CS service(s).

In the case as shown in FIG. 4, UE camps on E-UTRAN when it receives the paging. UE or eNodeB or MME trigger to perform call CS fallback or other CS fallback processing, afterwards, UE accessing CS domain from GERAN/UTRAN to perform CS service(s) such as a CS call;

1208: UE sends a CS paging response to GERAN/UTRAN;

1209: after receiving the CS paging response, GERAN/UTRAN transmits the CS paging response to MSC/VLR, and the MSC/VLR starts a CS service mobile terminating process after receiving the CS paging response.

Figure 13:
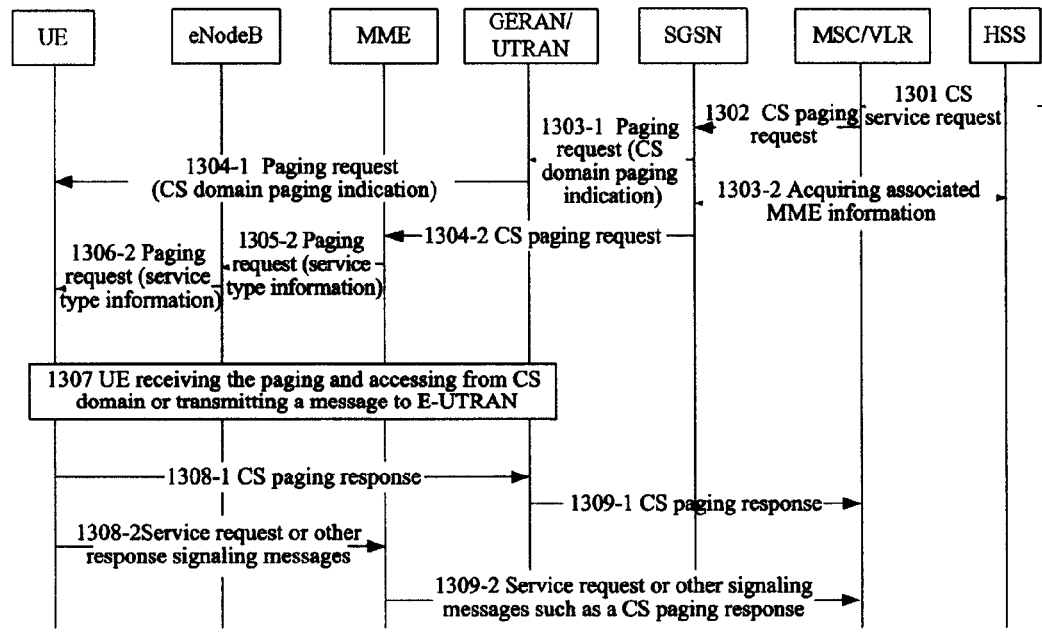
FIG. 13 is another processing flow in PS domain when MSC/VLR sends a CS paging request message to a SGSN according to Gs association in the present invention, wherein UE performs CS service(s) in EPS network when the UE receives paging in the E-UTRAN.

FIG. 13 is another processing flow in the PS domain when MSC/VLR sends a CS paging request message to a SGSN according to Gs association in the present invention, wherein UE performs CS service(s) in EPS network when the UE receives paging while camping on E-UTRAN, which is another implementing flow for applying the first example of the present invention to the scenario as shown in FIG. 4. The flow is as follows:

1301: MSC/VLR receives a CS service (e.g. Short Message Service, SMS) request;

1302: after receiving the CS service request, the MSC/VLR sends a CS paging request message to a SGSN according to the current Gs association;

1303-1, 1304-1 and 1303-2, 1304-2, 1305-2 and 1306-2 are executed in parallel.

1303-1: after receiving the CS paging request message, SGSN sends CS paging request to GERAN/UTRAN to request the GERAN/UTRAN to start to page the UE;

1304-1: after receiving the CS paging request, the GERAN/UTRAN performs CS paging via radio interface in the areas where the UE is currently located or all areas where the UE may be located;

1303-2: if the SGSN determines according to the stored ISR activation indication information that ISR is currently activated, it interacts with HSS to acquire ISR-associated MME information. If the SGSN has stored the MME information during ISR activation in the RAU procedure, this step can be skipped;

1304-2: after obtaining the MME information, the SGSN sends CS paging request to the MME to request it to start paging UE within E-UTRAN;

1305-2: after receiving the CS paging request sent by the SGSN, the MME sends paging request to eNodeB(s) serving the area where the UE is currently located or all eNodeB(s) serving the area where the UE currently may be located according to related information of the UE stored by itself to request the eNodeB(s) to page the UE; or MME sends a CS service notification message to one or all eNodeB(s) where the UE currently may be located;

1306-2: each eNodeB that has received the paging request or the CS service notification message starts to page UE via air interface or transmits the paging request or service notification message to the UE via an existing signaling connection;

1307: if the UE camps on E-UTRAN when it receives paging, the UE sends a service request or other responsive signaling messages to the MME. In the case as shown in FIG. 4, UE camps on E-UTRAN when it receives the paging; if UE camps on GERAN or UTRAN when it receives the paging, UE accesses CS domain from GERAN/UTRAN to perform CS service(s);

1308-1: UE sends a CS paging response to GERAN/UTRAN;

1309-1: after receiving the CS paging response, GERAN/UTRAN transmits the CS paging response to the MSC/VLR, and then the MSC/VLR starts a CS service mobile terminating process after receiving the CS paging response.

1308-2: UE sends a service request or other responsive signaling messages to the MME;

1309-2: the MME transmitting the service request or other responsive signaling messages such as a CS paging response to the MSC/VLR, and then the MSC/VLR starting a CS service mobile terminating process after receiving the CS paging response.

Figure 14:
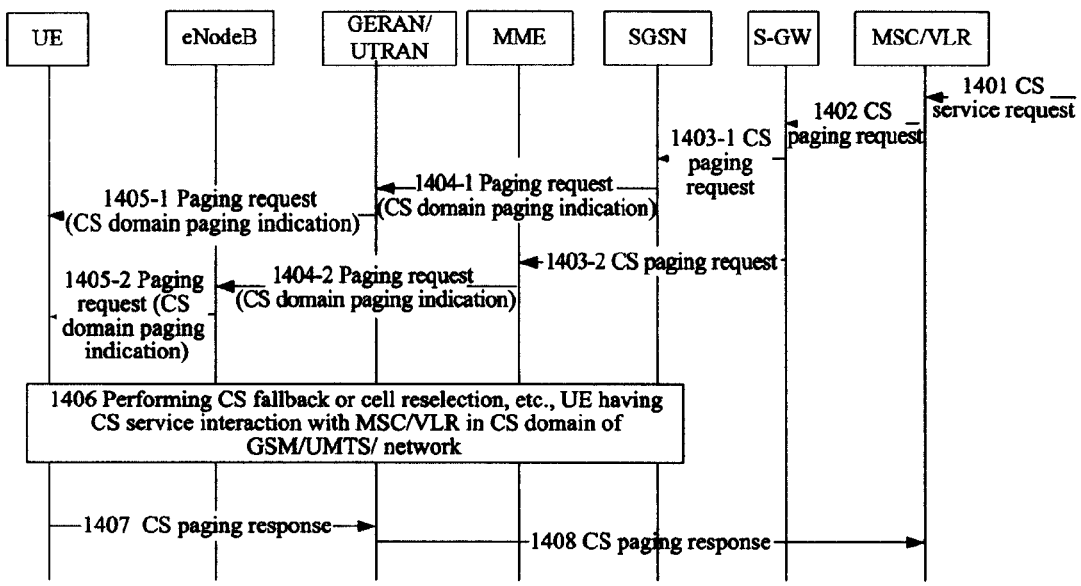
FIG. 14 is a processing flow in PS domain when MSC/VLR sends a CS paging request message to a S-GW according to Gs association in the present invention.

FIG. 14 is a processing flow in PS domain in the case that MSC/VLR sends a CS paging request message to a S-GW when Gs association between MSC/VLR and S-GW is established. In this case, S-GW determines that ISR is activated, and sends a CS paging request message to MME and SGSN respectively. After receiving the CS paging request message, MME and SGSN implement a CS paging process in EPS network and PS domain of GSM/UMTS network respectively. The flow is as follows:

1401: MSC/VLR receives a CS service request, for example, MSC/VLR receives an Initial Address Message of a call (i.e., an incoming call request). The calling party of the incoming call request may be a user of any type such as a fixed-network user, a mobile user, etc.

1402: after receiving the CS service request, for example, the incoming call request, the MSC/VLR sends a CS paging request message to a S-GW according to the current Gs association;

1403-1, 1404-1, 1405-1 and 1403-2, 1404-2, 1405-2 are executed in parallel.

1403-1: after receiving the CS paging request message, the S-GW sends a CS paging message to MME to request it to start to perform CS paging in E-UTRAN;

1404-1: after receiving the CS paging request sent by S-GW, MME sends a CS paging request or CS service notification message to eNodeB(s) serving the area where the UE is currently located or all eNodeBs serving the area where the UE may be currently located according to related information of UE stored by itself;

1405-1: each eNodeB that has received the CS paging request starts to page the UE via air interface or transmits the CS paging request or service notification message to the UE via existing signaling connection;

1403-2: after receiving the CS paging request message, S-GW sends a CS paging request message to SGSN to request it to start to perform CS paging in GERAN/UTRAN;

1404-2: after receiving the CS paging request message sent by S-GW, SGSN sends a CS paging request message to GERAN/UTRAN to request it to start paging UE;

1405-2: after receiving the CS paging request message, the GERAN/UTRAN performs CS paging via radio interface in the area where the UE is currently located or all areas where the UE may be located;

1406: the UE is paged on E-UTRAN or GERAN/UTRAN. When the UE camps on E-UTRAN when it receives the paging, call CS fallback or other CS fallback processing is performed, and after CS fallback, UE accesses CS domain from GERAN/UTRAN to perform CS service(s) such as a CS call; when UE camps on GERAN/UTRAN when it receives the paging, the UE accesses CS domain from GERAN/UTRAN to perform CS service(s) such as a CS call;

1407: UE sends a CS paging response to GERAN/UTRAN;

1408: after receiving the CS paging response, GERAN/UTRAN transmits the CS paging response to MSC/VLR, and then the MSC/VLR starts a CS service mobile terminating process after receiving the CS paging response.

FIGS. 15, 16, 17 and 18 illustrate the second example of the present invention, wherein the PS domain network element is able to know from which network the UE currently accesses, but the Gs association stored in MSC/VLR may be not accurate, it may be not a association with the PS network element of the network from which the UE currently accesses. In this example, MSC/VLR only initiates a CS paging that will be performed in one network. Although the method of the first example performing CS paging in two networks can work for this scenario, it will cause waste of network resources.

FIGS. 15, 16, 17 and 18 illustrate processing of MME or SGSN respectively receiving the CS paging sent by MSC/VLR, and their flow charts are similar to those of FIGS. 9, 10, 12 and 13, and thus will not be described here.

Figure 15:
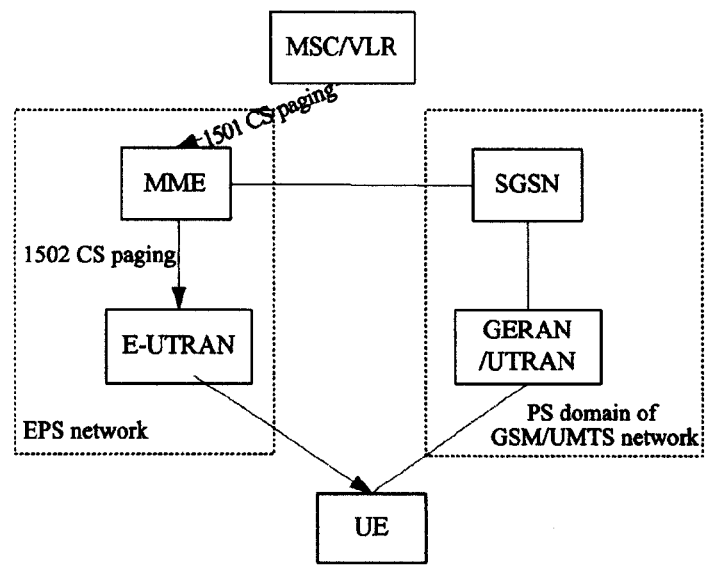
FIG. 15 illustrate the processing in PS domain when the MME receives the CS paging request message in the case that the UE currently camps on EPS network via E-UTRAN according to the present invention.
Figure 16:
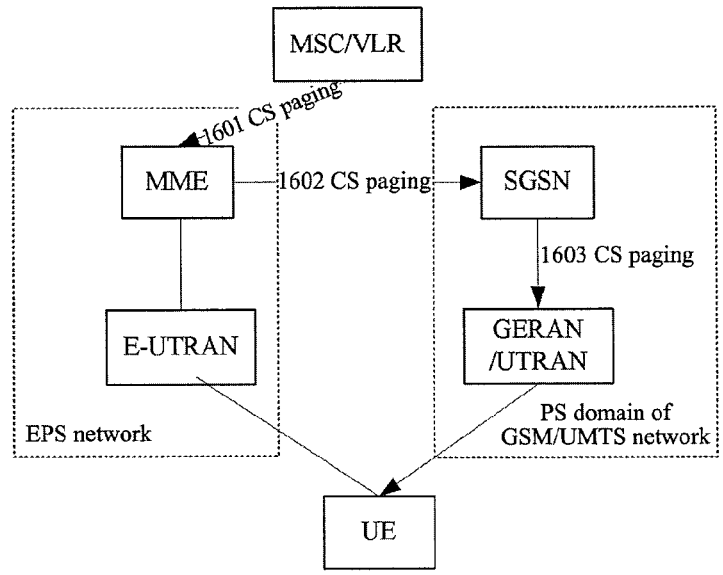
FIG. 16 illustrate the processing in PS domain when the MME receives the CS paging request message in the case that the UE currently camps on GSM/UTMS network according to the present invention.

The flow of processing of S-GW upon receiving the CS paging sent by MSC/VLR is similar to those shown in FIGS. 14, 15 and 16, and thus will not be described here.

The second example may be applied to the following scenario: ISR is activated, UE is in idle mode in one network and is in connected mode in another, and the PS domain network element that has received the CS paging request message is able to know from which network the UE currently accesses. For example, in the scenario as shown in FIG. 4, UE enters connected state in the MME of EPS network, and since the MME does not initiate location update procedure to MSC/VLR when UE enters connected state according to the prior art, what is recorded in the Gs association in MSC/VLR is SGSN, hence MSC/VLR sends the CS paging request to the SGSN, and the SGSN does not initiate paging in GERAN/UTRAN since it determines that currently the UE is not in GERAN/UTRAN, and only forwards the paging message to MME to initiate the CS paging process in E-UTRAN.

This example can also be applied to the following scenario: ISR is activated, UE is in idle mode in both of the two networks, but the PS domain network element that has received the CS paging request message is able to know from which network the UE currently accesses by the methods such as specification(s), implementation method, configuration and/or message interactions, as well as a combination of the above methods. For example, it is ensured by specification and/or implementation method that when the Gs association of MSC/VLR records SGSN information, UE accesses from GERAN/UTRAN. In this way, after receiving the CS paging request sent by MSC/VLR and determining that UE is in its serving network, SGSN only initiates paging in GERAN/UTRAN, and does not forward the paging message to MME to initiate paging in E-UTRAN.

As indicated above, the second example can be applied to a CS paging process in various cases that PS domain network element is able to know from which network the UE currently accesses.

FIG. 15 illustrates how to perform CS paging when MSC/VLR sends the CS paging request message to MME according to the Gs association, UE currently camps on the EPS network via E-UTRAN and the network knows that UE currently camps on E-UTRAN. The method is as follows:

1501: what is currently recorded in the Gs association in MSC/VLR is MME. When receiving a CS service request such as an incoming call request, the MSC/VLR sends a CS paging request message to the MME;

1502: after receiving the CS paging request message sent by the MSC/VLR, the MME sends a CS paging request or a CS service notification message to eNodeB(s) to start to perform CS paging in E-UTRAN. MME knows that the UE currently camps on E-UTRAN, so it does not need to send a CS paging request to SGSN to trigger CS paging to be performed in GERAN/UTRAN.

FIG. 16 illustrates how to perform CS paging when MSC/VLR sends the CS paging request message to MME according to the Gs association, UE currently camps on GSM/UMTS network and the network knows that UE currently camps on GSM/UMTS. The method is as follows:

1601: what is currently recorded in the Gs association in MSC/VLR is MME. When receiving a CS service request such as an incoming call request, the MSC/VLR sends a CS paging request message to the MME;

1602: after receiving the CS paging request message sent by the MSC/VLR, the MME sends a CS paging request to the associated SGSN;

1603: after receiving the CS paging request sent by MME, the SGSN sends a CS paging request to GERAN/UTRAN to start to perform CS paging in GERAN/UTRAN.

Figure 17:
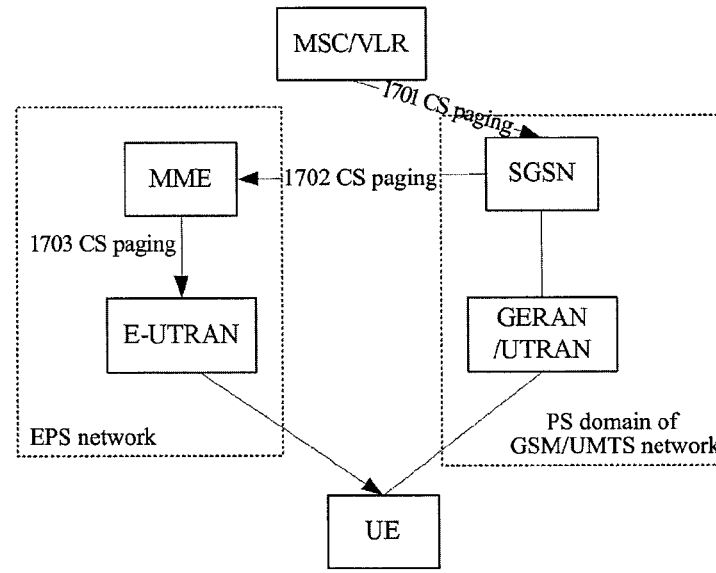
FIG. 17 illustrate the processing in PS domain when the SGSN receives the CS paging request message in the case that the UE currently camps on EPS network via E-UTRAN according to the present invention.

FIG. 17 illustrates how to perform CS paging when MSC/VLR sends a CS paging request message to SGSN according to the Gs association, UE currently camps on the EPS network via E-UTRAN and the network knows that the UE currently camps on E-UTRAN. The method is as follows:

1701: what is currently recorded in the Gs association in MSC/VLR is SGSN. When receiving a CS service request such as an incoming call request, the MSC/VLR sends a CS paging request message to the SGSN;

1702: after receiving the CS paging request message sent by the MSC/VLR, the SGSN sends a CS paging request to the associated MME;

1703: after receiving the CS paging request sent by SGSN, the MME sends a CS paging request or a CS service notification message to eNodeB(s) to start to perform CS paging in E-UTRAN.

Figure 18:
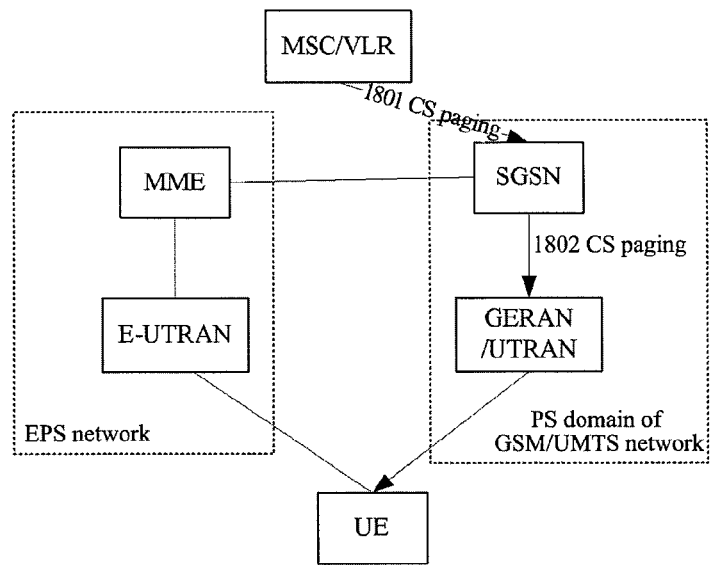
FIG. 18 illustrate the processing in PS domain when the SGSN receives the CS paging request message in the case that the UE currently camps on GSM/UTMS network according to the present invention.

FIG. 18 illustrates how to perform CS paging when MSC/VLR sends a CS paging request message to SGSN according to the Gs association, UE currently camps on the GSM/UMTS network and the network knows that UE currently camps on GSM/UMTS network. The method is as follows:

1801: what is currently recorded in the Gs association in MSC/VLR is SGSN. When receiving a CS service request such as an incoming call request, the MSC/VLR sends a CS paging request message to the SGSN;

1802: after receiving the CS paging request sent by the MSC/VLR, the SGSN sends a CS paging request to GERAN/UTRAN to start to perform CS paging in GERAN/UTRAN; SGSN knows that the UE currently camps on GERAN/UTRAN, so it does not need to send a CS paging request to MME to trigger CS paging to be performed in E-UTRAN.

In all of the embodiments as provided hereinbefore, the PS network element directly determines to initiate one or two CS paging procedures. Another implementing method of the present invention is that PS network element determines to initiate one or two CS paging procedures by the way of message interaction. This implementing method will be described below by taking MME receiving a CS paging request message as an example, and other implementations for a PS network element receiving a CS paging request message are similar.

After receiving a CS paging request, if MME determines that UE is currently in connected mode in EPS, it only sends a CS paging request to eNodeB(s) to request CS paging to be performed in E-UTRAN. If the UE is currently in idle mode and ISR is activated, the MME cannot know whether the UE is currently in connected mode or not in SGSN and the MME sends a CS paging request to the SGSN. The SGSN receives the CS paging request sent by the MME, and if the UE is also in idle mode in the SGSN, the SGSN sends a CS paging request response to the MME to tell MME to perform CS paging too; if the UE is in connected mode in the SGSN, SGSN only initiates a paging in GERAN/UTRAN and does not sends a CS paging request response message to the MME, so the MME does not initiate any CS paging process; or the SGSN sends a CS paging request response to the MME to tell MME not to perform CS paging. Or after receiving the CS paging request sent by MME, SGSN always sends a response message to the MME, and the MME can determine whether it needs to initiate a CS paging or not according to the response message.

When the present invention is implemented, when a signaling connection between the terminal and the PS domain network element has been established and the CS service can be implemented via the existing signaling connection, the PS domain network element can directly sends a service request or other signaling message such as a CS paging response to the MSC/VLR to inform the MSC/VLR to start the CS service, and the PS domain network element does not initiate a CS paging procedure.

When the present invention is implemented, it could be any combination of the implementing methods as shown in the first example and the second example, for example, for a MME, when the UE is in idle mode in it, it initiates two paging procedures in EPS network and GSM/UMTS network after receiving the CS paging message sent by MSC/VLR; when the UE is in connected mode in it, it initiates a paging procedure in EPS network or does not initiate any paging procedure after receiving the CS paging message sent by MSC/VLR; for a SGSN, it only initiates a paging procedure in GSM/UMTS network after receiving the CS paging message sent by MSC/VLR no matter the UE is in idle or connected mode in it.

A System Example

In the present example, a system for controlling CS paging is provided to be applied in the scenarios for performing CS paging for a called UE after ISR function is introduced.

Figure 19:
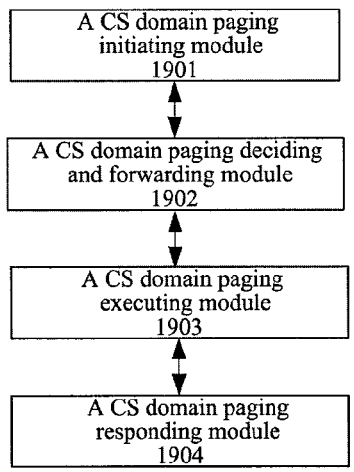
FIG. 19 illustrates the system for controlling CS paging according to the present invention.

As shown in FIG. 19, the system for controlling CS paging in this example comprises: a Circuit Switched (CS) domain paging initiating module 1901 located in a Mobile Switching Center (MSC)/Visitor Location Register (VLR), which is used for sending a CS domain paging message to a Packet Switched (PS) domain network element via Gs interface; a CS domain paging deciding and forwarding module 1902 located in a Mobility Management Entity (MME), or a Serving GPRS Support Node (SGSN), or a Serving Gateway (S-GW), which is used to determine that the CS domain paging is transmitted via GERAN/UTRAN/Universal Mobile Telecommunication System (UMTS) and E-UTRAN to the called UE, or via GERAN/UTRAN to the called UE, or via E-UTRAN to the called UE; a CS domain paging executing module 1903 located in a MME and/or a SGSN and radio access network(s), which are used to execute CS domain paging process; a CS domain paging responding module 1904 located in a called UE and radio access network(s) and/or a MME, which is used for sending an acknowledgement to the CS domain paging initiating module to end the CS domain paging process when receiving the CS domain paging.

Figure 20:
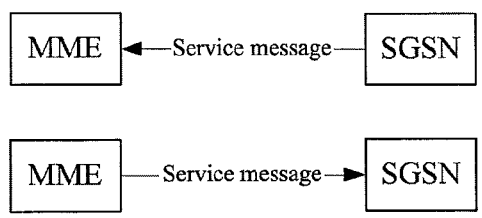
FIG. 20 illustrates the method for service implementation in the case that ISR function is activated according to the present invention.

As described in FIG. 8 and FIG. 11 as well as related descriptions and detailed flows thereof, the present invention also provides a method for service implementation when ISR function is activated. As shown in FIG. 20, the method implements services by transmitting a service message (for example, a CS paging message as shown in FIG. 8 and FIG. 11) between the ISR-associated MME and SGSN serving the UE. The method for service implementation when ISR is activated will be further described in detail with reference to FIG. 20.

When performing the service, after receiving a service request, a MME transmits a service message to the ISR-associated SGSN, according to the SGSN information obtained during ISR activation in TAU procedure or the SGSN information obtained by inquiring HSS, to inform the SGSN of the service information, and the SGSN operates correspondingly after obtaining the service information.

When performing the service, after receiving a service request, a SGSN transmits a service message to the ISR-associated MME, according to the MME information obtained during ISR activation in RAU procedure or the MME information obtained by inquiring HSS, to inform the MME of the service information, and the MME operates correspondingly after obtaining the service information.

In specific implementation, service information may be transferred in bidirectional or in unidirectional, i.e., ISR-associated MME and SGSN may transmit the service message to each other, or the service message may be only transmitted from the MME to the SGSN, or vice versa.

The method as described in this invention not only applies to aforementioned CS paging, but also can apply to other scenarios, for example, for the scenario where a service module has no interface or association with MME, in the service process, only a SGSN receives a service message from the service control module, the SGSN transmit the service information to the MME according to aforementioned method of the present invention.

Figure 1:
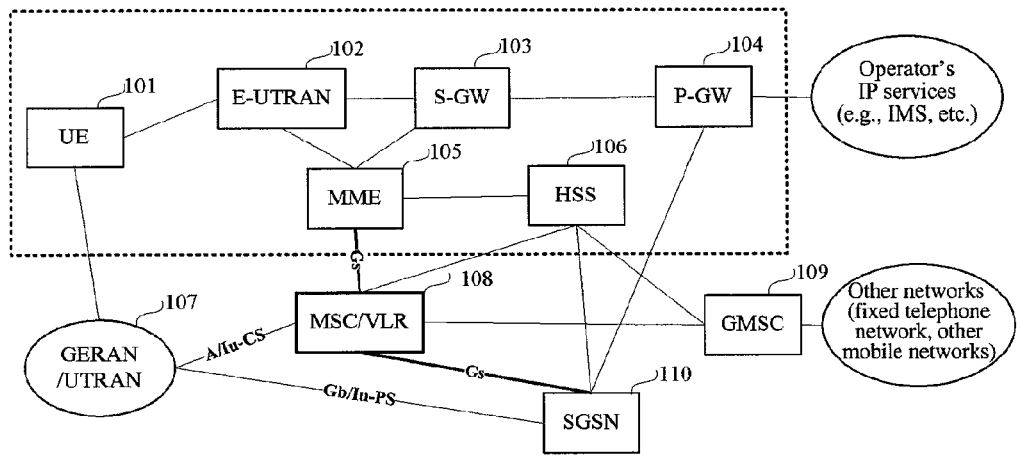
FIG. 1 illustrates the architecture of the network system to which the present invention applies.
Figure 2:
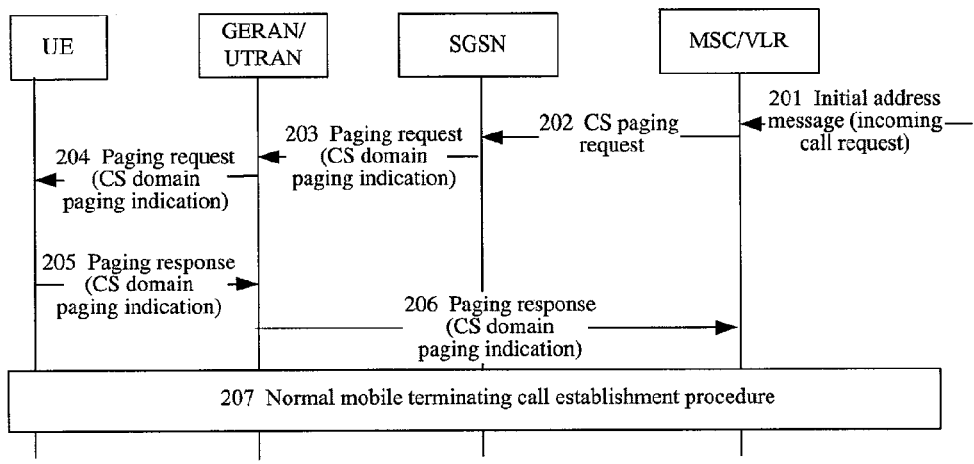
FIG. 2 is a flow of CS domain paging for UE in GSM/UMTS PS domain in the case that ISR function is not introduced.
Figure 3:
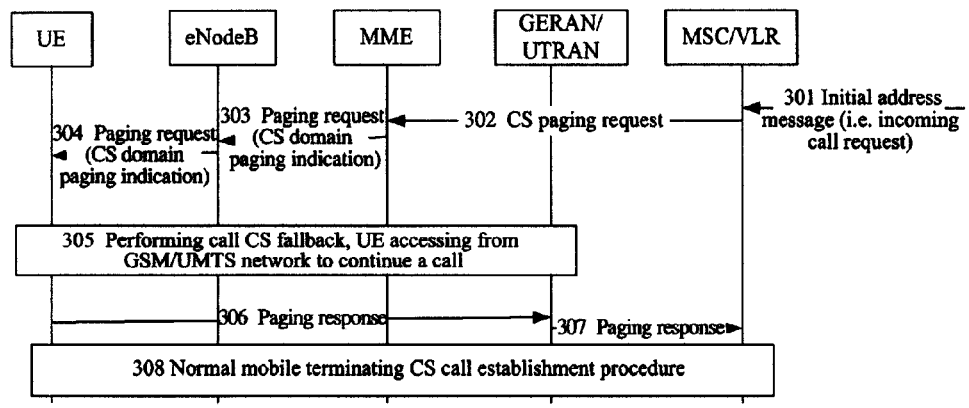
FIG. 3 is a flow of CS domain paging for UE in EPS network in the case that ISR function is not introduced.

The method and system of the present invention not only applies to the scenario as shown in FIG. 1 in which MME and SGSN are separate network elements, but also applies to various scenarios in which MME and SGSN are combined network elements, in which cases the service message (e.g., a CS paging message) between the MME and the SGSN may be implemented in the forms of a message between network elements or an internal message; and also applies to scenarios in which MME and SGSN are functionally integrated network elements, in which case the CS paging message between MME and SGSN may be implemented in the forms of an internal message or no message is needed.

The contents described in this document are just preferred embodiments of the present invention, and are not intended to limit the present invention. Various modifications and alterations can be made to the present invention for those skilled in the art. Any modification, equivalent substitute and improvement made to the present invention without departing from the spirit and principle of the present invention should fall within the protection scope of the present invention.

Of course, the present invention can also have many other embodiments, and those skilled in the art can make various corresponding variations and modifications according to the present invention without departing from the spirit and essence of the present invention, but these variations and modifications should all fall within the protection scope of the attached claims.

INDUSTRIAL APPLICABILITY

To sum up, the method of the present invention implements CS domain paging after introduction of ISR function, which does not only satisfy the application requirements for correctly performing CS domain paging in various scenarios, but also enables MSC/VLR processing to remain same as it was before, and without needing to understand and process ISR-related information or participate in ISR activation procedure, and which has the advantage that the MSC/VLR in the existing network does not need to be upgraded to support CS fallback in ISR used scenarios, thus reduces operating costs and risks of the existing network, ensuring applicability of GSM/UMTS network CS domain, and meanwhile reducing deployment costs and risks of an EPS network, which is favorable for fast popularization of EPS network.

What we claim is:

1. A method for implementing paging for Circuit Switched (CS) service, comprising:
   Mobile Switching Center (MSC)/Visitor Location Register (VLR) storing only one Gs association recording a first Packet Switched (PS) domain network element of a first radio access network in a scenario that Idle-mode Signaling Reduction (ISR) function has been introduced in the PS domain;
   when performing the paging for CS service to a terminating User Equipment (UE), the MSC/VLR sending a CS domain paging request message to the first PS domain network element recorded in the only one Gs association stored in the MSC/VLR; and
   when ISR is active, after receiving the CS domain paging request message,
   the first PS domain network element initiating one paging procedure for the terminating UE to be performed in the first radio access network, and the first PS domain network element sending a CS domain paging message to a second PS domain network element to initiate another paging procedure for the terminating UE to be performed in a second radio access network; or when the first PS domain network element determines that the UE is in idle mode in the first radio access network, the first PS domain network element initiating one paging procedure for the terminating UE to be performed in the first radio access network, and the first PS domain network element sending a CS domain paging message to a second PS domain network element to initiate another paging procedure for the terminating UE to be performed in a second radio access network;

wherein when the first PS domain network element is a Mobility Management Entity (MME), the first radio access network is Evolved Universal Mobile Telecommunication System Terrestrial Radio Access Network (E-UTRAN), the second PS domain network element is a Serving General packet radio service Support Node (SGSN), the second radio access network is Global System for Mobile communication (GSM) Enhanced Data Rate for GSM Evolution Radio Access Network (GERAN)/Universal Mobile Telecommunication System Terrestrial Radio Access Network (UTRAN), the step of the first PS domain network element sending the CS domain paging message to the second PS domain network element comprises: the MME sending the CS domain paging message to the SGSN according to SGSN information obtained during ISR activation in Tracking Area Update (TAU) procedure to inform the SGSN of paging the UE in the GERAN/UTRAN; or when the first PS domain network element is a SGSN, the first radio access network is GERAN/UTRAN, the second PS domain network element is a MME, the second radio access network is E-UTRAN, the step of the first PS domain network element sending the CS domain paging message to the second PS domain network element comprises: the SGSN sending the CS domain paging message to the MME according to MME information obtained during ISR activation in Routing Area Update (RAU) procedure to inform the MME of paging the UE in the E-UTRAN.

2. The method according to claim 1, wherein when the ISR is active,
the first PS domain network element initiates the CS domain paging procedures of the GSM/UMTS and the EPS to be performed respectively in the GERAN/UTRAN and the E-UTRAN upon receiving the CS domain paging request message; or
the first PS domain network element initiates the CS domain paging to be performed only in the GERAN/UTRAN or E-UTRAN.

3. The method according to claim 2, wherein:
if the first PS domain network element is a MME, the MME initiates the CS domain paging in the E-UTRAN and sends a CS domain paging message to an ISR-associated SGSN to inform the SGSN to initiate the CS domain paging in the GERAN/UTRAN;
if the first PS domain network element is a SGSN, the SGSN initiates the CS domain paging in the GERAN/UTRAN, and sends a CS domain paging message to an ISR-associated MME to inform the MME to initiate the CS domain paging in the E-UTRAN;
if the first PS domain network element is a MME and the terminating UE camps on E-UTRAN, the MME only initiates the CS domain paging in the E-UTRAN;
if the first PS domain network element is a MME and the terminating UE camps on GERAN/UTRAN, the MME sends a CS domain paging message to an ISR-associated SGSN to inform the SGSN to initiate the CS domain paging in the GERAN/UTRAN;
if the first PS domain network element is a SGSN and the terminating UE camps on the E-UTRAN, the SGSN sends a CS domain paging message to an ISR-associated MME to inform the MME to initiate the CS domain paging in the E-UTRAN;
if the first PS domain network element is a SGSN and the terminating UE camps on the GERAN/UTRAN, the SGSN initiates the CS domain paging in the GERAN/UTRAN.

4. The method according to claim 1, wherein:
after receiving the CS domain paging request message,
when the first PS domain network element determines that the UE is currently in connected mode in the first radio access network, the PS domain network element initiates only one paging procedure for the terminating UE to be performed in the first radio access network; or
when the first PS domain network element determines that the UE is currently in idle mode in the first radio access network, the first PS domain network element sends a CS paging request to the second PS domain network element of the second radio access network, wherein
when the second PS domain network element determines that the UE is currently in idle mode in the second radio access network, the second PS domain network element performs the paging procedure in the second radio access network and sends a CS paging response to the first PS domain network element to tell the first PS domain network element to also perform the paging procedure in the first radio access network, or
when the second PS domain network element determines that the UE is currently in connected mode in the second radio access network, the second PS domain network element performs the paging procedure in the second radio access network, and sends a CS paging response to the first PS domain network element to tell the first PS domain network element not to perform the paging procedure in the first radio access network, or does not reply the CS paging request, the first PS domain network element does not perform the paging procedure in the first radio access network when receiving no CS paging response.

5. A system for implementing a paging for Circuit Switched (CS) service, comprising a Mobile Switching Center (MSC)/Visitor Location Register (VLR), and a first Packet Switched (PS) domain network element in a first radio access network, wherein:
the MSC/VLR stores only one Gs association recording the first PS domain network element of the first radio access network in a scenario that Idle-mode Signaling Reduction (ISR) function has been introduced in the PS domain, and the MSC/VLR is configured to: send a CS domain paging request message to the first PS domain network element recorded in the only one Gs association stored in the MSC/VLR in a process of CS domain paging to a terminating User Equipment (UE);
when ISR is active, the first PS domain network element is configured to: after receiving the CS domain paging request message,
initiate one paging procedure for the terminating UE to be performed in the first radio access network and send a CS domain paging message to a second PS domain network element to initiate another paging procedure for the terminating UE to be performed in a second radio access network; or when the first PS domain network element determines that the UE is in idle mode in the first radio access network, initiate one paging procedure for the terminating UE to be performed in the first radio access network and send a CS domain paging message to a second PS domain network element to initiate another paging procedure for the terminating UE to be performed in a second radio access network;

wherein when the first PS domain network element is a Mobility Management Entity (MME), the first radio access network is Evolved Universal Mobile Telecommunication System Terrestrial Radio Access Network (E-UTRAN), the second PS domain network element is a Serving General packet radio service Support Node (SGSN), the second radio access network is Global System for Mobile communication (GSM) Enhanced Data Rate for GSM Evolution Radio Access Network (GERAN)/Universal Mobile Telecommunication System Terrestrial Radio Access Network (UTRAN), the MME is configured to send the CS domain paging message to the SGSN according to SGSN information obtained during ISR activation in Tracking Area Update (TAU) procedure to inform the SGSN of paging the UE in the GERAN/UTRAN; or when the first PS domain network element is a SGSN, the first radio access network is GERAN/UTRAN, the second PS domain network element is a MME, the second radio access network is E-UTRAN, the SGSN is configured to send the CS domain paging message to the MME according to MME information obtained during ISR activation in Routing Area Update (RAU) procedure to inform the MME of paging the UE in the E-UTRAN.

6. The system according to claim 5, wherein when ISR is active, the first PS domain network element is configured to initiate the CS domain paging for the GSM/UMTS and EPS to be performed respectively in the GERAN/UTRAN and E-UTRAN upon receiving the CS domain paging request message; or the first PS domain network element is configured to initiate a CS domain paging only in GERAN/UTRAN or E-UTRAN.

7. The system according to claim 6, wherein the first PS domain network element is a Mobility Management Entity (MME), and the MME initiates the CS domain paging in the E-UTRAN and sends a CS domain paging message to an ISR-associated Serving General packet radio service Support Node (SGSN) to inform the SGSN to initiates the CS domain paging in the GERAN/UTRAN;

or, the first PS domain network element is a Serving General packet radio service Support Node (SGSN), and the SGSN initiates the CS domain paging in the GERAN/UTRAN, and the SGSN sends a CS domain paging message to an ISR-associated Mobility Management Entity (MME) to inform the MME to initiate the CS domain paging in the E-UTRAN;

or, the first PS domain network element is a MME, and when the terminating UE camps on E-UTRAN, the MME initiates the CS domain paging in the E-UTRAN; or when the terminating UE camps on GERAN/UTRAN, the MME sends a CS domain paging message to an ISR-associated SGSN to inform the SGSN to initiate the CS domain paging in the GERAN/UTRAN; or the first PS domain network element is a SGSN, and when the terminating UE camps on E-UTRAN, the SGSN sends a CS domain paging message to an ISR-associated MME to inform the MME to initiate the CS domain paging in the E-UTRAN; or when the terminating UE camps on GERAN/UTRAN, the SGSN initiates the CS domain paging in the GERAN/UTRAN.

8. The system according to claim 5, wherein:

the first PS domain network element is configured to initiate only one paging procedure for the terminating UE to be performed in the first radio access network when the first PS domain network element determines that the UE is currently in connected mode in the first radio access network; or send a CS paging request to the second PS domain network element of the second radio access network when the first PS domain network element determines that the UE is currently in idle mode in the first radio access network, perform the paging procedure in the first radio access network according to the instruction in a CS paging response from the second PS domain network element, or not perform the paging procedure in the first radio access network when receiving no CS paging response;

after receiving the CS paging request from the first PS domain network element, the second PS domain network element is configured to when determining that the UE is currently in idle mode in the second radio access network, perform the paging procedure in the second radio access network and send a CS paging response to the first PS domain network element to tell the first PS domain network element to also perform the paging procedure in the first radio access network, or when determining that the UE is currently in connected mode in the second radio access network, perform the paging procedure in the second radio access network, and send a CS paging response to the first PS domain network element to tell the first PS domain network element not to perform the paging procedure in the first radio access network, or not reply the CS paging request.

9. A method for transferring paging for a Circuit Switched (CS) service, comprising:

a first Packet Switched (PS) domain network element in a first radio access network receiving a paging message for a Circuit Switched (CS) service from a Mobile Switching Center (MSC)/Visitor Location Register (VLR) via Gs interface; and when Idle-mode Signaling Reduction (ISR) is active in the PS domain, after receiving the paging message for a CS service from the MSC/VLR, the first PS domain network element initiating one paging procedure for the terminating UE to be performed in the first radio access network and sending a CS domain paging message to a second PS domain network element to initiate another paging procedure for the terminating UE to be performed in a second radio access network; or when determining that the UE is in idle mode in the first radio access network, initiating one paging procedure for the terminating UE to be performed in the first radio access network and sending a CS domain paging message to a second PS domain network element to initiate another paging procedure for the terminating UE to be performed in a second radio access network;

wherein the first PS domain network element is a Mobility Management Entity (MME), the first radio access network is Evolved Universal Mobile Telecommunication System Terrestrial Radio Access Network (E-UTRAN), the second PS domain network element is a Serving General packet radio service Support Node (SGSN), the second radio access network is Global System for Mobile communication (GSM) Enhanced Data Rate for GSM Evolution Radio Access Network (GERAN)/Universal Mobile Telecommunication System Terrestrial Radio Access Network (UTRAN), the step of sending the CS domain paging message to the second PS domain network element comprises: the MME sending the CS domain paging message to the SGSN according to SGSN information obtained during ISR activation in Tracking Area Update (TAU) procedure to inform the SGSN of doing a CS paging for the UE in the GERAN/UTRAN; or the first PS domain network element is a SGSN, the first radio access network is GERAN/UTRAN, the second PS domain network element is a MME, the second radio access network is E-UTRAN, the step of sending the CS domain paging message to the second PS domain network element comprises: the SGSN sending the CS domain paging message to the MME according to MME information obtained during ISR activation in Routing Area Update (RAU) procedure to inform the MME of doing a CS paging for the UE in the E-UTRAN.

10. The method according to claim 9, wherein the CS domain paging message is transferred in unidirectional or bidirectional;

when the CS domain paging message is transferred in bidirectional or only in unidirectional from the MME to the SGSN, upon receiving a CS domain paging request message, the MME transmits the CS domain paging message to the ISR-associated SGSN; or when the CS domain paging message is transferred in bidirectional or only in unidirectional from the SGSN to the MME, upon receiving a CS domain paging request message, the SGSN transmits the CS domain paging message to the ISR-associated MME.

11. The method according to claim 10, wherein the MME transmits the CS domain paging message to the ISR-associated SGSN upon receiving the CS domain paging request message from the MSC/VLR, or the SGSN transmits the CS domain paging message to the ISR-associated MME upon receiving the CS domain paging request message from the MSC/VLR.

12. A Mobile Switching Center (MSC)/Visitor Location Register (VLR), comprising:

a processor; and a storage device for storing processor executable instructions that when executed by the processor cause the processor to perform the following steps:

storing only one Gs association recording a Mobility Management Entity (MME) or a Serving General packet radio service Support Node (SGSN) in a scenario that Idle-mode Signaling Reduction (ISR) function has been introduced in Packet Switched (PS) domain; and sending a paging message for a Circuit Switched (CS) service via Gs interface to one of the MME or SGSN that is recorded in the only one Gs association stored in the MSC/VLR, when performing a paging for CS service to a User Equipment (UE) via the PS domain, after ISR is activated in the PS domain; wherein the MME sends a CS domain paging message to the SGSN according to SGSN information obtained during ISR activation in Tracking Area Update (TAU) procedure to inform the SGSN to page the UE, or the SGSN sends a CS domain paging message to the MME according to MME information obtained during ISR activation in Routing Area Update (RAU) procedure to inform the MME to page the UE.

13. A first Packet Switched (PS) domain network element in a first radio access network, comprising:

a processor; and a storage device for storing processor executable instructions that when executed by the processor cause the processor to perform the following steps:

receiving a paging message for a Circuit Switched (CS) service from a Mobile Switching Center (MSC)/Visitor Location Register (VLR) via Gs interface; and when Idle-mode Signaling Reduction (ISR) is active in the PS domain, after receiving the paging message for a CS service from the MSC/VLR, initiating one paging procedure for the terminating UE to be performed in the first radio access network and sending a CS domain paging message to a second PS domain network element to initiate another paging procedure for the terminating UE to be performed in a second radio access network; or when determining that the UE is in idle mode in the first radio access network, initiating one paging procedure for the terminating UE to be performed in the first radio access network and sending a CS domain paging message to a second PS domain network element to initiate another paging procedure for the terminating UE to be performed in a second radio access network;

wherein the first PS domain network element is a Mobility Management Entity (MME), the first radio access network is Evolved Universal Mobile Telecommunication System Terrestrial Radio Access Network (E-UTRAN), the second PS domain network element is a Serving General packet radio service Support Node (SGSN), the second radio access network is Global System for Mobile communication (GSM) Enhanced Data Rate for GSM Evolution Radio Access Network (GERAN)/Universal Mobile Telecommunication System Terrestrial Radio Access Network (UTRAN), the step of sending the CS domain paging message to the second PS domain network element comprises: the MME sending the CS domain paging message to the SGSN according to SGSN information obtained during ISR activation in Tracking Area Update (TAU) procedure to inform the SGSN of doing a CS paging for the UE in the GERAN/UTRAN; or the first PS domain network element is a SGSN, the first radio access network is GERAN/UTRAN, the second PS domain network element is a MME, the second radio access network is E-UTRAN, the step of sending the CS domain paging message to the second PS domain network element comprises: the SGSN sending the CS domain paging message to the MME according to MME information obtained during ISR activation in Routing Area Update (RAU) procedure to inform the MME of doing a CS paging for the UE in the E-UTRAN.

* * * * *